US010215189B2

(12) United States Patent
Dutka et al.

(10) Patent No.: US 10,215,189 B2
(45) Date of Patent: Feb. 26, 2019

(54) COMPRESSOR BLADE FOR A GAS TURBINE ENGINE

(71) Applicant: General Electric Company, Schenectady, NY (US)

(72) Inventors: Michael James Dutka, Simpsonville, SC (US); Kenneth Paul Rivard, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 401 days.

(21) Appl. No.: 15/208,047

(22) Filed: Jul. 12, 2016

(65) Prior Publication Data

US 2018/0017076 A1 Jan. 18, 2018

(51) Int. Cl.

| | |
|---|---|
| ***F01D 9/02*** | (2006.01) |
| ***F02C 3/06*** | (2006.01) |
| ***F04D 29/54*** | (2006.01) |
| ***F04D 29/38*** | (2006.01) |
| ***F01D 5/14*** | (2006.01) |

(52) U.S. Cl.

CPC ........... *F04D 29/544* (2013.01); *F01D 5/141* (2013.01); *F04D 29/384* (2013.01); *F05B 2220/302* (2013.01); *F05B 2250/70* (2013.01); *F05D 2220/32* (2013.01); *F05D 2240/35* (2013.01); *F05D 2250/74* (2013.01)

(58) Field of Classification Search

CPC ...... F01D 5/141; F04D 29/384; F04D 29/544; F02C 3/06; F05D 2220/32; F05D 2240/35; F05D 2250/74

See application file for complete search history.

(56) References Cited

U.S. PATENT DOCUMENTS

| | | | | |
|---|---|---|---|---|
| 5,980,209 | A | 11/1999 | Barry et al. | |
| 7,568,892 | B2 | 8/2009 | Devangada et al. | |
| 9,746,000 | B2 * | 8/2017 | Dutka | F04D 29/563 |
| 9,938,985 | B2 * | 4/2018 | Dutka | F04D 29/324 |
| 10,012,239 | B2 * | 7/2018 | Dutka | F04D 29/324 |
| 2006/0073014 | A1 * | 4/2006 | Tomberg | F01D 5/141 416/96 R |
| 2012/0051926 | A1 * | 3/2012 | Dutka | F01D 5/141 416/223 A |
| 2013/0336777 | A1 * | 12/2013 | McKeever | F04D 29/542 415/208.1 |
| 2013/0336778 | A1 * | 12/2013 | Dutka | F04D 29/563 415/208.1 |
| 2013/0336798 | A1 * | 12/2013 | Dutka | F04D 29/324 416/223 R |

(Continued)

*Primary Examiner* — Igor Kershteyn

(74) *Attorney, Agent, or Firm* — Mark E. Henderson; Ernest G. Cusick; Frank A. Landgraff

(57) ABSTRACT

An article of manufacture having a nominal airfoil profile substantially in accordance with Cartesian coordinate values of X, Y and Z set forth in a scalable table, the scalable table selected from the group of tables consisting of TABLE 1, wherein the Cartesian coordinate values of X, Y and Z are non-dimensional values convertible to dimensional distances by multiplying the Cartesian coordinate values of X, Y and Z by a number, and wherein X and Y are coordinates which, when connected by continuing arcs, define airfoil profile sections at each Z height, the airfoil profile sections at each Z height being joined with one another to form a complete airfoil shape.

20 Claims, 2 Drawing Sheets

(56) References Cited

U.S. PATENT DOCUMENTS

| | | | | |
|---|---|---|---|---|
| 2014/0030098 | A1* | 1/2014 | Dutka .................. | F01D 5/3038<br>416/219 R |
| 2018/0017077 | A1* | 1/2018 | Delvernois .......... | F04D 29/544 |

* cited by examiner

COMPRESSOR BLADE FOR A GAS TURBINE ENGINE

RELATED APPLICATIONS

The present application is related to Ser. Nos. 15/208,019, 15/208,089 filed concurrently herewith, which are each fully incorporated by reference herein and made a part hereof.

BACKGROUND OF THE INVENTION

The present invention relates generally to an airfoil for use in turbomachinery, and more particularly relates to an airfoil profile or airfoil shape for use in a compressor.

In turbomachines, many system requirements should be met at each stage of the turbomachine's flow path to meet design goals. These design goals include, but are not limited to, overall improved efficiency, reduction of vibratory response and improved airfoil loading capability. For example, a compressor airfoil profile should achieve thermal and mechanical operating requirements for a particular stage in the compressor. Moreover, component lifetime, reliability and cost targets also should be met.

BRIEF DESCRIPTION OF THE INVENTION

According to one aspect of the present invention an article of manufacture is provided having a nominal airfoil profile substantially in accordance with Cartesian coordinate values of X, Y and Z set forth in a scalable table, the scalable table selected from the group of tables consisting of TABLE 1, wherein the Cartesian coordinate values of X, Y and Z are non-dimensional values convertible to dimensional distances by multiplying the Cartesian coordinate values of X, Y and Z by a number, and wherein X and Y are coordinates which, when connected by continuing arcs, define airfoil profile sections at each Z height, the airfoil profile sections at each Z height being joined with one another to form a complete airfoil shape.

According to another aspect of the present invention an article of manufacture is provided having a suction-side nominal airfoil profile substantially in accordance with suction-side Cartesian coordinate values of X, Y and Z set forth in a scalable table, the scalable table selected from the group of tables consisting of TABLE 1, wherein the Cartesian coordinate values of X, Y and Z are non-dimensional values convertible to dimensional distances by multiplying the Cartesian coordinate values of X, Y and Z by a number, and wherein X and Y are coordinates which, when connected by continuing arcs, define airfoil profile sections at each Z height, the airfoil profile sections at each Z height being joined with one another to form a complete suction-side airfoil shape, the X, Y and Z coordinate values being scalable as a function of the number to provide one of a non-scaled, scaled-up and scaled-down airfoil profile.

According to yet another aspect of the present invention a compressor is provided comprising a plurality of stator vanes, each of the stator vanes including an airfoil having a suction-side airfoil shape, the airfoil having a nominal profile substantially in accordance with suction-side Cartesian coordinate values of X, Y and Z set forth in a scalable table, the scalable table selected from the group of tables consisting of TABLE 1, wherein the Cartesian coordinate values of X, Y and Z are non-dimensional values convertible to dimensional distances by multiplying the Cartesian coordinate values of X, Y and Z by a number, and wherein X and Y are coordinates which, when connected by continuing arcs, define airfoil profile sections at each Z height, the airfoil profile sections at each Z height being joined with one another to form a complete suction-side airfoil shape.

These and other features and improvements of the present invention should become apparent to one of ordinary skill in the art upon review of the following detailed description when taken in conjunction with the several drawings and the appended claims.

DETAILED DESCRIPTION OF THE INVENTION

One or more specific aspects/embodiments of the present invention will be described below. In an effort to provide a concise description of these aspects/embodiments, all features of an actual implementation may not be described in the specification. It should be appreciated that in the development of any such actual implementation, as in any engineering or design project, numerous implementation-specific decisions must be made to achieve the developers' specific goals, such as compliance with machine-related, system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "one aspect" or "an embodiment" or "an aspect" of the present invention are not intended to be interpreted as excluding the existence of additional embodiments or aspects that also incorporate the recited features. Turbomachinery is defined as one or more machines that transfer energy between a rotor and a fluid or vice-versa, including but not limited to gas turbines, steam turbines and compressors.

Figure 1:
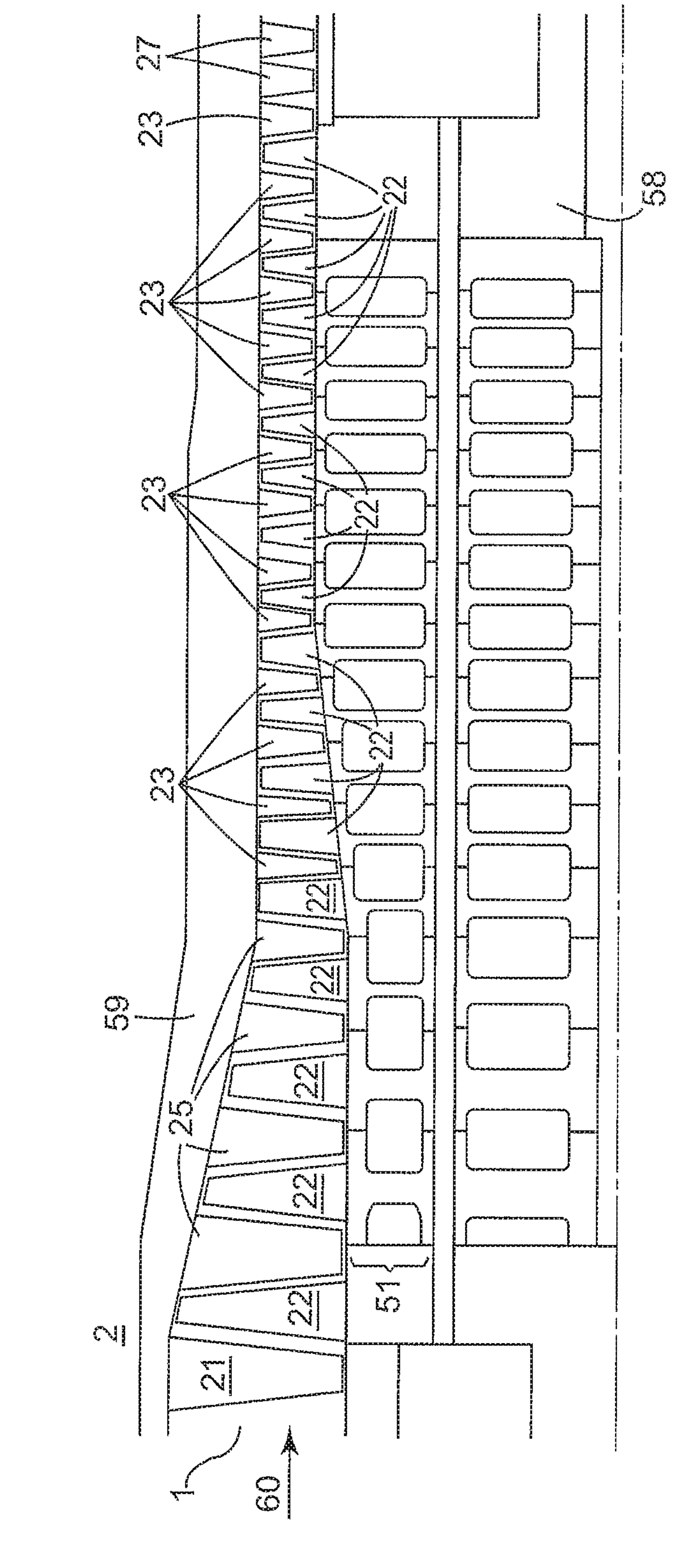
FIG. 1 is a schematic representation of a compressor flow path through multiple stages and illustrates exemplary compressor stages according to an aspect of the invention.

Referring now to the drawings, FIG. 1 illustrates an axial compressor flow path 1 of a compressor 2 that includes a plurality of compressor stages. The compressor 2 may be used in conjunction with, or as part of, a gas turbine. As one non-limiting example only, the compressor flow path 1 may comprise about eighteen rotor/stator stages. However, the exact number of rotor and stator stages is a choice of engineering design, and may be more or less than the illustrated eighteen stages. It is to be understood that any number of rotor and stator stages can be provided in the compressor, as embodied by the invention. The eighteen stages are merely exemplary of one turbine/compressor design, and are not intended to limit the invention in any manner.

The compressor rotor blades 22 impart kinetic energy to the airflow and therefore bring about a desired pressure rise. Directly following the rotor blades 22 is a stage of stator compressor vanes 23. However, in some designs the stator vanes may precede the rotor blades. Both the rotor blades and stator vanes turn the airflow, slow the airflow velocity (in the respective airfoil frame of reference), and yield a rise in the static pressure of the airflow. Typically, multiple rows of rotor/stator stages are arranged in axial flow compressors to achieve a desired discharge to inlet pressure ratio. Each rotor blade and stator vane includes an airfoil, and these airfoils can be secured to rotor wheels or a stator case by an appropriate attachment configuration, often known as a "root," "base" or "dovetail". In addition, compressors may also include inlet guide vanes (IGVs) 21, variable stator vanes (VSVs) 25 and exit or exhaust guide vanes (EGVs) 27. The specific number of VSV and EGV stages are not limited to that shown, and may vary as desired in the specific application. All of these blades and vanes have airfoils that act on the medium (e.g., air) passing through the compressor flow path 1.

Exemplary stages of the compressor 2 are illustrated in FIG. 1. One stage of the compressor 2 comprises a plurality of circumferentially spaced rotor blades 22 mounted on a rotor wheel 51 and a plurality of circumferentially spaced stator vanes 23 attached to a static compressor case 59. Each of the rotor wheels 51 may be attached to an aft drive shaft 58, which may be connected to the turbine section of the engine. The rotor blades 22 and stator vanes 23 lie in the flow path 1 of the compressor 2. The direction of airflow through the compressor flow path 1, as embodied by the invention, is indicated by the arrow 60 (FIG. 1), and flows generally from left to right in the illustration. The rotor blades and stator vanes herein of the compressor 2 are merely exemplary of the stages of the compressor 2 within the scope of the invention. In addition, each inlet guide vane 21, rotor blade 22, stator vane 23, variable stator vane 25 and exit guide vane 27 may be considered an article of manufacture. Further, the article of manufacture may comprise a stator vane configured for use with a compressor.

Figure 2:
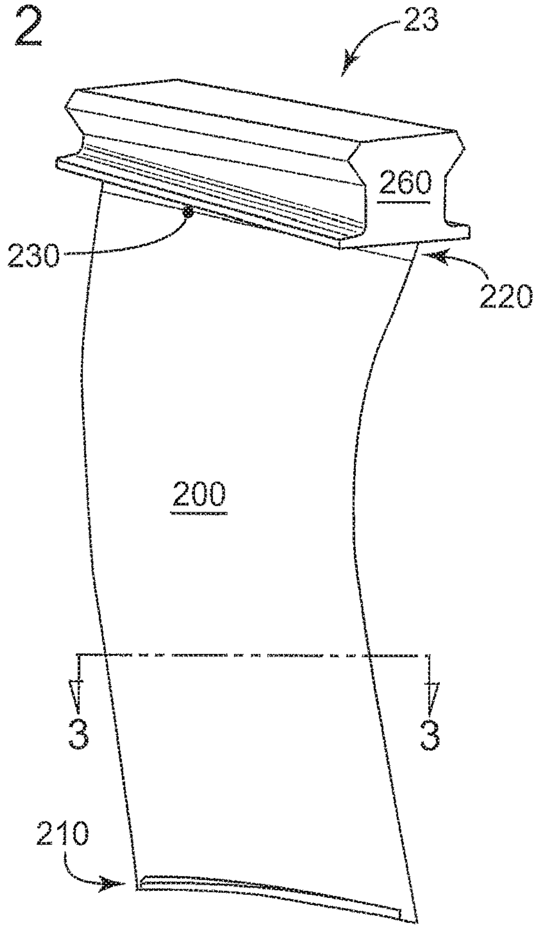
FIG. 2 is a perspective view of a stator vane, according to an aspect of the invention.

A stator vane 23, illustrated in FIG. 2, is provided with an airfoil 200. Each of the stator vanes 23 has an airfoil profile at any cross-section from the airfoil root 220 to the airfoil tip 210. The airfoil connects to a mounting base 260, which may also be referred to as a dovetail. The mounting base fits into a complementary shaped groove or slot in the case 59.

Figure 3:
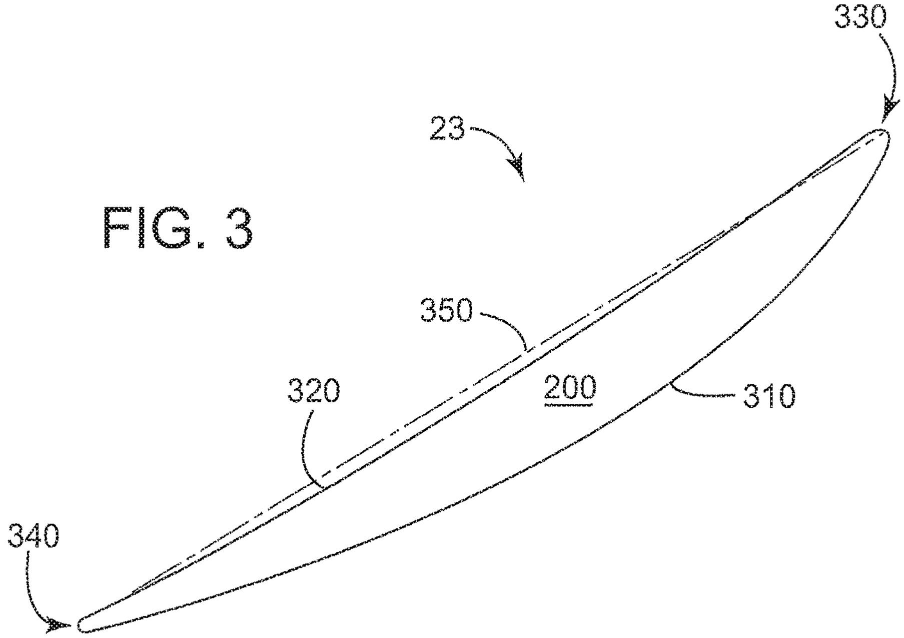
FIG. 3 is a cross-sectional view of the stator vane airfoil taken generally about line 3-3 in FIG. 2, according to an aspect of the present invention.

Referring to FIG. 3, it will be appreciated that each stator vane 23 has an airfoil 200 as illustrated. The airfoil 200 has a suction side 310 and a pressure side 320. The suction side 310 is located on the opposing side of the airfoil from the pressure side 320. Thus, each of the stator vanes 23 has an airfoil profile at any cross-section in the shape of the airfoil 200. The airfoil 200 also includes a leading edge 330 and a trailing edge 340, and a chord length 350 extends therebetween. The root of the airfoil corresponds to the lowest non-dimensional Z value of scalable Table 1. The tip of the airfoil corresponds to the highest non-dimensional Z value of scalable Table 1. An airfoil may extend beyond the compressor flowpath and may be tipped to achieve the desired endwall clearances. As non-limiting examples only, the height of the airfoil 200 may be from about 1 inch to about 20 inches or more, about 2 inches to about 12 inches, or about 4 inches to about 9 inches. However, any specific airfoil height may be used as desired in the specific application.

The compressor flow path 1 requires airfoils that meet system requirements of aerodynamic and mechanical blade/vane loading and efficiency. For example, it is desirable that the airfoils are designed to reduce the vibratory response or vibratory stress response of the respective blades and/or vanes. Materials such as high strength alloys, non-corrosive alloys and/or stainless steels may be used in the blades and/or vanes. To define the airfoil shape of each blade airfoil and/or vane airfoil, there is a unique set or loci of points in space that meet the stage requirements and can be manufactured. These unique loci of points meet the requirements for stage efficiency and are arrived at by iteration between aerodynamic and mechanical loadings enabling the turbine and compressor to run in an efficient, safe, reliable and smooth manner. These points are unique and specific to the system. The locus that defines the airfoil profile includes a set of points with X, Y and Z coordinates relative to a reference origin coordinate system. The three-dimensional Cartesian coordinate system of X, Y and Z values given in scalable Table 1 below defines the profile of the variable stator vane airfoil at various locations along its length. Scalable Table 1 list data for a non-coated airfoil. The envelope/tolerance for the coordinates is about +/−5% of the chord length 350 in a direction normal to any airfoil surface location, or about +/−0.25 inches in a direction normal to any airfoil surface location. However, tolerances of about +/−0.15 inches to about +/−0.25 inches, or about +/−3% to about +/−5% in a direction normal to an airfoil surface location may also be used, as desired in the specific application.

The point data origin 230 may be the mid-point of the suction or pressure side of the base of the airfoil, the leading edge or trailing edge of the base of the airfoil, or any other suitable location as desired. The coordinate values for the X, Y and Z coordinates are set forth in non-dimensionalized units in scalable Table 1, although other units of dimensions may be used when the values are appropriately converted. As one example only, the Cartesian coordinate values of X, Y and Z may be convertible to dimensional distances by multiplying the X, Y and Z values by a multiplying by a constant number (e.g., 100). The number, used to convert the non-dimensional values to dimensional distances, may be a fraction (e.g., ½, ¼, etc.), decimal fraction (e.g., 0.5, 1.5, 10.25, etc.), integer (e.g., 1, 2, 10, 100, etc.) or a mixed number (e.g., 1½, 10¼, etc.). The dimensional distances may be any suitable format (e.g., inches, feet, millimeters, centimeters, meters, etc.). As one non-limiting example only, the Cartesian coordinate system has orthogonally-related X, Y and Z axes and the X axis may lie generally parallel to the compressor rotor centerline, i.e., the rotary axis and a positive X coordinate value is axial toward the aft, i.e., exhaust end of the turbine. The positive Y coordinate value extends tangentially in the direction of rotation of the rotor and the positive Z coordinate value is radially outwardly toward the rotor blade tip or stator vane base. All the values in scalable Table 1 are given at room temperature and are unfilleted.

By defining X and Y coordinate values at selected locations in a Z direction (or height) normal to the X, Y plane, the profile section or airfoil shape of the airfoil, at each Z height along the length of the airfoil can be ascertained. By connecting the X and Y values with smooth continuing arcs, each profile section at each Z height is fixed. The airfoil profiles of the various surface locations between each Z height are determined by smoothly connecting the adjacent profile sections to one another to form the airfoil profile.

The values in Table 1 are generated and shown from zero to four or more decimal places for determining the profile of the airfoil. As the airfoil heats up the associated stress and temperature will cause a change in the X, Y and Z values. Accordingly, the values for the profile given in Table 1 represent ambient, non-operating or non-hot conditions (e.g., room temperature) and are for an uncoated airfoil.

There are typical manufacturing tolerances as well as optional coatings which must be accounted for in the actual profile of the airfoil. Each section is joined smoothly with the other sections to form the complete airfoil shape. It will therefore be appreciated that +/− typical manufacturing tolerances, i.e., +/− values, including any coating thicknesses, are additive to the X and Y values given in Table 1 below. Accordingly, a distance of about +/−5% of chord length and/or +/−0.25 inches in a direction normal to a surface location along the airfoil profile defines an airfoil profile envelope for this particular airfoil design and compressor, i.e., a range of variation between measured points on the actual airfoil surface at nominal cold or room temperature and the ideal position of those points as given in the Tables below at the same temperature. Additionally, a distance of about +/−5% of a chord length in a direction normal to an airfoil surface location along the airfoil profile also may define an airfoil profile envelope for this particular airfoil design. The data is scalable and the geometry pertains to all aerodynamic scales, at, above and/or below about 3,600 RPM. The stator vane airfoil design is robust to this range of variation without impairment of mechanical and aerodynamic functions.

The coordinate values given in scalable Table 1 below provide the nominal profile for exemplary stages of a compressor stator vane.

TABLE 1

| SUCTION SIDE | | | PRESSURE SIDE | | |
|---|---|---|---|---|---|
| X | Y | Z | X | Y | Z |
| −0.9757 | 0.5085 | −0.6 | 1.1589 | −0.6704 | −0.6 |
| −0.9784 | 0.5056 | −0.6 | 1.1589 | −0.6699 | −0.6 |
| −0.9809 | 0.5007 | −0.6 | 1.159 | −0.6689 | −0.6 |
| −0.9824 | 0.4942 | −0.6 | 1.159 | −0.6669 | −0.6 |
| −0.9828 | 0.4861 | −0.6 | 1.1585 | −0.663 | −0.6 |
| −0.9817 | 0.4754 | −0.6 | 1.1563 | −0.6573 | −0.6 |
| −0.9788 | 0.4618 | −0.6 | 1.149 | −0.6491 | −0.6 |
| −0.9739 | 0.4452 | −0.6 | 1.135 | −0.6445 | −0.6 |
| −0.9667 | 0.4254 | −0.6 | 1.1158 | −0.6404 | −0.6 |
| −0.957 | 0.4023 | −0.6 | 1.0917 | −0.6349 | −0.6 |
| −0.9446 | 0.3757 | −0.6 | 1.0606 | −0.6271 | −0.6 |
| −0.929 | 0.345 | −0.6 | 1.0251 | −0.6169 | −0.6 |
| −0.9099 | 0.31 | −0.6 | 0.9876 | −0.6047 | −0.6 |
| −0.887 | 0.2711 | −0.6 | 0.9459 | −0.5897 | −0.6 |
| −0.8599 | 0.2285 | −0.6 | 0.9 | −0.572 | −0.6 |
| −0.8284 | 0.1824 | −0.6 | 0.85 | −0.5515 | −0.6 |
| −0.7924 | 0.1331 | −0.6 | 0.7983 | −0.5288 | −0.6 |
| −0.7536 | 0.0829 | −0.6 | 0.7449 | −0.504 | −0.6 |
| −0.7118 | 0.0321 | −0.6 | 0.6897 | −0.477 | −0.6 |
| −0.6664 | −0.019 | −0.6 | 0.6329 | −0.4478 | −0.6 |
| −0.6173 | −0.0702 | −0.6 | 0.5743 | −0.4166 | −0.6 |
| −0.5646 | −0.1216 | −0.6 | 0.5141 | −0.3832 | −0.6 |
| −0.5081 | −0.1729 | −0.6 | 0.4521 | −0.3478 | −0.6 |
| −0.4476 | −0.2241 | −0.6 | 0.3885 | −0.3104 | −0.6 |
| −0.3851 | −0.2733 | −0.6 | 0.3253 | −0.2724 | −0.6 |
| −0.3208 | −0.3202 | −0.6 | 0.2623 | −0.2339 | −0.6 |
| −0.2551 | −0.3643 | −0.6 | 0.1996 | −0.1951 | −0.6 |
| −0.1879 | −0.4054 | −0.6 | 0.1368 | −0.1563 | −0.6 |
| −0.1192 | −0.4435 | −0.6 | 0.0741 | −0.1175 | −0.6 |
| −0.0489 | −0.4783 | −0.6 | 0.0112 | −0.0789 | −0.6 |
| 0.0229 | −0.51 | −0.6 | −0.0518 | −0.0405 | −0.6 |

TABLE 1-continued

| SUCTION SIDE | | | PRESSURE SIDE | | |
|---|---|---|---|---|---|
| X | Y | Z | X | Y | Z |
| 0.0962 | −0.5386 | −0.6 | −0.1147 | −0.002 | −0.6 |
| 0.171 | −0.5642 | −0.6 | −0.1775 | 0.0367 | −0.6 |
| 0.2472 | −0.587 | −0.6 | −0.2402 | 0.0756 | −0.6 |
| 0.3244 | −0.607 | −0.6 | −0.3027 | 0.1149 | −0.6 |
| 0.3995 | −0.6237 | −0.6 | −0.3629 | 0.153 | −0.6 |
| 0.4726 | −0.6374 | −0.6 | −0.421 | 0.19 | −0.6 |
| 0.5434 | −0.6486 | −0.6 | −0.477 | 0.2258 | −0.6 |
| 0.612 | −0.6576 | −0.6 | −0.5309 | 0.2601 | −0.6 |
| 0.678 | −0.6647 | −0.6 | −0.5828 | 0.2931 | −0.6 |
| 0.7416 | −0.6702 | −0.6 | −0.6325 | 0.325 | −0.6 |
| 0.8026 | −0.6744 | −0.6 | −0.6798 | 0.3559 | −0.6 |
| 0.861 | −0.6777 | −0.6 | −0.7231 | 0.3841 | −0.6 |
| 0.9142 | −0.68 | −0.6 | −0.7624 | 0.4093 | −0.6 |
| 0.962 | −0.6816 | −0.6 | −0.7979 | 0.4316 | −0.6 |
| 1.0045 | −0.683 | −0.6 | −0.8293 | 0.4508 | −0.6 |
| 1.0444 | −0.6848 | −0.6 | −0.8568 | 0.4672 | −0.6 |
| 1.0789 | −0.6867 | −0.6 | −0.8803 | 0.4806 | −0.6 |
| 1.1054 | −0.6883 | −0.6 | −0.9007 | 0.4915 | −0.6 |
| 1.1267 | −0.6896 | −0.6 | −0.9181 | 0.5 | −0.6 |
| 1.1425 | −0.6894 | −0.6 | −0.9328 | 0.5063 | −0.6 |
| 1.1527 | −0.6834 | −0.6 | −0.945 | 0.5103 | −0.6 |
| 1.1566 | −0.678 | −0.6 | −0.9545 | 0.5124 | −0.6 |
| 1.1581 | −0.674 | −0.6 | −0.9618 | 0.5129 | −0.6 |
| 1.1586 | −0.672 | −0.6 | −0.9679 | 0.5123 | −0.6 |
| 1.1588 | −0.6709 | −0.6 | −0.9726 | 0.5106 | −0.6 |
| −0.9566 | 0.6295 | 0 | 1.1647 | −0.4815 | 0 |
| −0.9591 | 0.6265 | 0 | 1.1647 | −0.481 | 0 |
| −0.9612 | 0.6217 | 0 | 1.1648 | −0.4801 | 0 |
| −0.9624 | 0.6152 | 0 | 1.1648 | −0.4781 | 0 |
| −0.9623 | 0.6074 | 0 | 1.1643 | −0.4743 | 0 |
| −0.9607 | 0.597 | 0 | 1.1622 | −0.4687 | 0 |
| −0.9573 | 0.5839 | 0 | 1.1549 | −0.4608 | 0 |
| −0.9517 | 0.568 | 0 | 1.1411 | −0.4565 | 0 |
| −0.9438 | 0.549 | 0 | 1.1221 | −0.4525 | 0 |
| −0.9334 | 0.5269 | 0 | 1.0985 | −0.4471 | 0 |
| −0.9202 | 0.5015 | 0 | 1.068 | −0.4396 | 0 |
| −0.9038 | 0.4721 | 0 | 1.0331 | −0.4298 | 0 |
| −0.8838 | 0.4388 | 0 | 0.9962 | −0.418 | 0 |
| −0.8599 | 0.4018 | 0 | 0.9551 | −0.4036 | 0 |
| −0.8318 | 0.3613 | 0 | 0.9099 | −0.3867 | 0 |
| −0.7993 | 0.3176 | 0 | 0.8606 | −0.3671 | 0 |
| −0.7624 | 0.271 | 0 | 0.8096 | −0.3456 | 0 |
| −0.7227 | 0.2236 | 0 | 0.7567 | −0.322 | 0 |
| −0.68 | 0.1757 | 0 | 0.7022 | −0.2963 | 0 |
| −0.6338 | 0.1275 | 0 | 0.6459 | −0.2687 | 0 |
| −0.5841 | 0.0794 | 0 | 0.5878 | −0.239 | 0 |
| −0.5309 | 0.0312 | 0 | 0.5281 | −0.2073 | 0 |
| −0.474 | −0.0168 | 0 | 0.4666 | −0.1737 | 0 |
| −0.4132 | −0.0647 | 0 | 0.4035 | −0.1383 | 0 |
| −0.3506 | −0.1105 | 0 | 0.3407 | −0.1022 | 0 |
| −0.2863 | −0.1541 | 0 | 0.2781 | −0.0656 | 0 |
| −0.2208 | −0.1949 | 0 | 0.2157 | −0.0289 | 0 |
| −0.154 | −0.233 | 0 | 0.1534 | 0.0079 | 0 |
| −0.0859 | −0.2681 | 0 | 0.0909 | 0.0446 | 0 |
| −0.0164 | −0.3003 | 0 | 0.0284 | 0.0811 | 0 |
| 0.0545 | −0.3295 | 0 | −0.0343 | 0.1174 | 0 |
| 0.1267 | −0.356 | 0 | −0.097 | 0.1537 | 0 |
| 0.2002 | −0.3797 | 0 | −0.1596 | 0.1901 | 0 |
| 0.2748 | −0.4008 | 0 | −0.2221 | 0.2268 | 0 |
| 0.3503 | −0.4194 | 0 | −0.2844 | 0.2636 | 0 |
| 0.4238 | −0.435 | 0 | −0.3445 | 0.2995 | 0 |
| 0.4951 | −0.448 | 0 | −0.4024 | 0.3343 | 0 |
| 0.5642 | −0.4586 | 0 | −0.4583 | 0.3679 | 0 |
| 0.6311 | −0.4672 | 0 | −0.5122 | 0.4002 | 0 |
| 0.6955 | −0.474 | 0 | −0.564 | 0.431 | 0 |
| 0.7575 | −0.4795 | 0 | −0.6137 | 0.4608 | 0 |
| 0.817 | −0.4837 | 0 | −0.6612 | 0.4897 | 0 |
| 0.8739 | −0.4871 | 0 | −0.7045 | 0.5159 | 0 |
| 0.9257 | −0.4895 | 0 | −0.744 | 0.5393 | 0 |
| 0.9723 | −0.4912 | 0 | −0.7795 | 0.56 | 0 |
| 1.0138 | −0.4928 | 0 | −0.811 | 0.5778 | 0 |
| 1.0526 | −0.4947 | 0 | −0.8385 | 0.5929 | 0 |
| 1.0863 | −0.4967 | 0 | −0.862 | 0.6052 | 0 |
| 1.1121 | −0.4983 | 0 | −0.8824 | 0.6153 | 0 |
| 1.1328 | −0.4996 | 0 | −0.8998 | 0.623 | 0 |
| 1.1483 | −0.4997 | 0 | −0.9144 | 0.6287 | 0 |

TABLE 1-continued

| SUCTION SIDE | | | PRESSURE SIDE | | |
|---|---|---|---|---|---|
| X | Y | Z | X | Y | Z |
| 1.1585 | −0.4941 | 0 | −0.9264 | 0.6322 | 0 |
| 1.1623 | −0.489 | 0 | −0.9359 | 0.634 | 0 |
| 1.1639 | −0.4851 | 0 | −0.9431 | 0.6343 | 0 |
| 1.1644 | −0.4831 | 0 | −0.9491 | 0.6335 | 0 |
| 1.1646 | −0.482 | 0 | −0.9536 | 0.6317 | 0 |
| −0.938 | 0.7493 | 0.6 | 1.1695 | −0.2999 | 0.6 |
| −0.9404 | 0.7463 | 0.6 | 1.1695 | −0.2994 | 0.6 |
| −0.9424 | 0.7415 | 0.6 | 1.1696 | −0.2984 | 0.6 |
| −0.9434 | 0.7352 | 0.6 | 1.1697 | −0.2965 | 0.6 |
| −0.9431 | 0.7275 | 0.6 | 1.1692 | −0.2928 | 0.6 |
| −0.9413 | 0.7174 | 0.6 | 1.1671 | −0.2872 | 0.6 |
| −0.9376 | 0.7047 | 0.6 | 1.1598 | −0.2795 | 0.6 |
| −0.9315 | 0.6893 | 0.6 | 1.1462 | −0.2755 | 0.6 |
| −0.923 | 0.6711 | 0.6 | 1.1276 | −0.2716 | 0.6 |
| −0.9119 | 0.65 | 0.6 | 1.1044 | −0.2664 | 0.6 |
| −0.8979 | 0.6259 | 0.6 | 1.0744 | −0.259 | 0.6 |
| −0.8804 | 0.598 | 0.6 | 1.04 | −0.2496 | 0.6 |
| −0.8593 | 0.5665 | 0.6 | 1.0036 | −0.2383 | 0.6 |
| −0.8344 | 0.5313 | 0.6 | 0.9631 | −0.2246 | 0.6 |
| −0.8054 | 0.4928 | 0.6 | 0.9185 | −0.2085 | 0.6 |
| −0.7722 | 0.4514 | 0.6 | 0.8699 | −0.1897 | 0.6 |
| −0.7346 | 0.4074 | 0.6 | 0.8194 | −0.1692 | 0.6 |
| −0.6941 | 0.3627 | 0.6 | 0.7671 | −0.1467 | 0.6 |
| −0.6506 | 0.3177 | 0.6 | 0.7131 | −0.1223 | 0.6 |
| −0.6038 | 0.2724 | 0.6 | 0.6573 | −0.096 | 0.6 |
| −0.5536 | 0.2272 | 0.6 | 0.5998 | −0.0678 | 0.6 |
| −0.4999 | 0.1819 | 0.6 | 0.5405 | −0.0377 | 0.6 |
| −0.4427 | 0.1368 | 0.6 | 0.4795 | −0.0058 | 0.6 |
| −0.3818 | 0.0919 | 0.6 | 0.4168 | 0.0279 | 0.6 |
| −0.3192 | 0.0491 | 0.6 | 0.3544 | 0.0622 | 0.6 |
| −0.2554 | 0.0087 | 0.6 | 0.2922 | 0.0969 | 0.6 |
| −0.1904 | −0.0293 | 0.6 | 0.2302 | 0.1318 | 0.6 |
| −0.1241 | −0.0646 | 0.6 | 0.1682 | 0.1667 | 0.6 |
| −0.0566 | −0.0972 | 0.6 | 0.1061 | 0.2015 | 0.6 |
| 0.0123 | −0.1271 | 0.6 | 0.0438 | 0.2361 | 0.6 |
| 0.0824 | −0.1543 | 0.6 | −0.0185 | 0.2705 | 0.6 |
| 0.1538 | −0.1789 | 0.6 | −0.0809 | 0.3047 | 0.6 |
| 0.2263 | −0.201 | 0.6 | −0.1432 | 0.3391 | 0.6 |
| 0.2996 | −0.2207 | 0.6 | −0.2055 | 0.3736 | 0.6 |
| 0.3734 | −0.2381 | 0.6 | −0.2676 | 0.4084 | 0.6 |
| 0.4452 | −0.2527 | 0.6 | −0.3275 | 0.4422 | 0.6 |
| 0.515 | −0.265 | 0.6 | −0.3853 | 0.475 | 0.6 |
| 0.5826 | −0.2751 | 0.6 | −0.441 | 0.5067 | 0.6 |
| 0.6479 | −0.2833 | 0.6 | −0.4946 | 0.5372 | 0.6 |
| 0.7108 | −0.29 | 0.6 | −0.5463 | 0.5662 | 0.6 |
| 0.7713 | −0.2954 | 0.6 | −0.596 | 0.5941 | 0.6 |
| 0.8293 | −0.2997 | 0.6 | −0.6435 | 0.6209 | 0.6 |
| 0.8849 | −0.3032 | 0.6 | −0.687 | 0.6453 | 0.6 |
| 0.9355 | −0.3058 | 0.6 | −0.7265 | 0.6671 | 0.6 |
| 0.981 | −0.3078 | 0.6 | −0.762 | 0.6863 | 0.6 |
| 1.0215 | −0.3096 | 0.6 | −0.7934 | 0.7028 | 0.6 |
| 1.0594 | −0.3117 | 0.6 | −0.8209 | 0.7169 | 0.6 |
| 1.0922 | −0.3139 | 0.6 | −0.8444 | 0.7283 | 0.6 |
| 1.1175 | −0.3156 | 0.6 | −0.8647 | 0.7375 | 0.6 |
| 1.1377 | −0.3171 | 0.6 | −0.882 | 0.7446 | 0.6 |
| 1.1528 | −0.3175 | 0.6 | −0.8966 | 0.7497 | 0.6 |
| 1.163 | −0.3123 | 0.6 | −0.9085 | 0.7529 | 0.6 |
| 1.167 | −0.3072 | 0.6 | −0.9179 | 0.7543 | 0.6 |
| 1.1687 | −0.3034 | 0.6 | −0.925 | 0.7544 | 0.6 |
| 1.1692 | −0.3014 | 0.6 | −0.9308 | 0.7534 | 0.6 |
| 1.1694 | −0.3004 | 0.6 | −0.9352 | 0.7515 | 0.6 |
| −0.9145 | 0.8885 | 1.4 | 1.1664 | −0.1178 | 1.4 |
| −0.9167 | 0.8854 | 1.4 | 1.1665 | −0.1173 | 1.4 |
| −0.9187 | 0.8808 | 1.4 | 1.1666 | −0.1164 | 1.4 |
| −0.9196 | 0.8746 | 1.4 | 1.1667 | −0.1145 | 1.4 |
| −0.9193 | 0.8671 | 1.4 | 1.1663 | −0.1108 | 1.4 |
| −0.9174 | 0.8572 | 1.4 | 1.1644 | −0.1053 | 1.4 |
| −0.9135 | 0.8449 | 1.4 | 1.1573 | −0.0976 | 1.4 |
| −0.9072 | 0.83 | 1.4 | 1.144 | −0.0935 | 1.4 |
| −0.8982 | 0.8125 | 1.4 | 1.1258 | −0.0894 | 1.4 |
| −0.8863 | 0.7924 | 1.4 | 1.1031 | −0.0841 | 1.4 |
| −0.8715 | 0.7695 | 1.4 | 1.0737 | −0.0766 | 1.4 |
| −0.8531 | 0.7432 | 1.4 | 1.04 | −0.0672 | 1.4 |
| −0.8312 | 0.7132 | 1.4 | 1.0043 | −0.056 | 1.4 |
| −0.8057 | 0.6797 | 1.4 | 0.9646 | −0.0424 | 1.4 |
| −0.7764 | 0.6428 | 1.4 | 0.9208 | −0.0265 | 1.4 |

TABLE 1-continued

| SUCTION SIDE | | | PRESSURE SIDE | | |
|---|---|---|---|---|---|
| X | Y | Z | X | Y | Z |
| −0.743 | 0.6032 | 1.4 | 0.873 | −0.0082 | 1.4 |
| −0.7051 | 0.5612 | 1.4 | 0.8234 | 0.0119 | 1.4 |
| −0.6642 | 0.5188 | 1.4 | 0.772 | 0.0338 | 1.4 |
| −0.6202 | 0.4763 | 1.4 | 0.7188 | 0.0575 | 1.4 |
| −0.5731 | 0.4336 | 1.4 | 0.6639 | 0.083 | 1.4 |
| −0.5228 | 0.3909 | 1.4 | 0.6072 | 0.1103 | 1.4 |
| −0.4692 | 0.3482 | 1.4 | 0.5487 | 0.1394 | 1.4 |
| −0.4122 | 0.3056 | 1.4 | 0.4886 | 0.1702 | 1.4 |
| −0.3517 | 0.2633 | 1.4 | 0.4266 | 0.2026 | 1.4 |
| −0.2896 | 0.2229 | 1.4 | 0.365 | 0.2356 | 1.4 |
| −0.2265 | 0.1848 | 1.4 | 0.3035 | 0.2689 | 1.4 |
| −0.1624 | 0.1489 | 1.4 | 0.2422 | 0.3025 | 1.4 |
| −0.097 | 0.1156 | 1.4 | 0.1809 | 0.3362 | 1.4 |
| −0.0306 | 0.0847 | 1.4 | 0.1196 | 0.3698 | 1.4 |
| 0.0371 | 0.0565 | 1.4 | 0.0581 | 0.403 | 1.4 |
| 0.106 | 0.0308 | 1.4 | −0.0035 | 0.4361 | 1.4 |
| 0.1759 | 0.0075 | 1.4 | −0.0652 | 0.469 | 1.4 |
| 0.2468 | −0.0136 | 1.4 | −0.1269 | 0.502 | 1.4 |
| 0.3184 | −0.0325 | 1.4 | −0.1885 | 0.535 | 1.4 |
| 0.3905 | −0.0492 | 1.4 | −0.2501 | 0.5682 | 1.4 |
| 0.4605 | −0.0635 | 1.4 | −0.3095 | 0.6003 | 1.4 |
| 0.5286 | −0.0756 | 1.4 | −0.3669 | 0.6314 | 1.4 |
| 0.5944 | −0.0858 | 1.4 | −0.4222 | 0.6615 | 1.4 |
| 0.6581 | −0.0943 | 1.4 | −0.4754 | 0.6904 | 1.4 |
| 0.7194 | −0.1014 | 1.4 | −0.5267 | 0.7181 | 1.4 |
| 0.7783 | −0.1073 | 1.4 | −0.576 | 0.7445 | 1.4 |
| 0.8349 | −0.1123 | 1.4 | −0.6234 | 0.7696 | 1.4 |
| 0.8891 | −0.1165 | 1.4 | −0.6667 | 0.7923 | 1.4 |
| 0.9383 | −0.1198 | 1.4 | −0.706 | 0.8127 | 1.4 |
| 0.9827 | −0.1225 | 1.4 | −0.7412 | 0.8311 | 1.4 |
| 1.0221 | −0.125 | 1.4 | −0.7721 | 0.8473 | 1.4 |
| 1.0591 | −0.1277 | 1.4 | −0.7991 | 0.861 | 1.4 |
| 1.0911 | −0.1304 | 1.4 | −0.8222 | 0.8722 | 1.4 |
| 1.1157 | −0.1326 | 1.4 | −0.8423 | 0.8809 | 1.4 |
| 1.1353 | −0.1343 | 1.4 | −0.8595 | 0.8874 | 1.4 |
| 1.1501 | −0.1348 | 1.4 | −0.874 | 0.8918 | 1.4 |
| 1.1601 | −0.1298 | 1.4 | −0.8859 | 0.8942 | 1.4 |
| 1.164 | −0.1248 | 1.4 | −0.8952 | 0.895 | 1.4 |
| 1.1656 | −0.1212 | 1.4 | −0.9021 | 0.8945 | 1.4 |
| 1.1661 | −0.1192 | 1.4 | −0.9077 | 0.893 | 1.4 |
| 1.1663 | −0.1183 | 1.4 | −0.9118 | 0.8908 | 1.4 |
| −0.8904 | 0.9898 | 2.2 | 1.1533 | 0.0039 | 2.2 |
| −0.8925 | 0.9868 | 2.2 | 1.1533 | 0.0044 | 2.2 |
| −0.8943 | 0.9822 | 2.2 | 1.1534 | 0.0053 | 2.2 |
| −0.895 | 0.9761 | 2.2 | 1.1535 | 0.0071 | 2.2 |
| −0.8945 | 0.9687 | 2.2 | 1.1532 | 0.0108 | 2.2 |
| −0.8924 | 0.9592 | 2.2 | 1.1515 | 0.0162 | 2.2 |
| −0.8882 | 0.9473 | 2.2 | 1.1448 | 0.0239 | 2.2 |
| −0.8817 | 0.9329 | 2.2 | 1.1319 | 0.0283 | 2.2 |
| −0.8724 | 0.9161 | 2.2 | 1.114 | 0.0326 | 2.2 |
| −0.8602 | 0.8968 | 2.2 | 1.0918 | 0.0381 | 2.2 |
| −0.8451 | 0.875 | 2.2 | 1.0631 | 0.0458 | 2.2 |
| −0.8263 | 0.8498 | 2.2 | 1.0301 | 0.0555 | 2.2 |
| −0.8041 | 0.8211 | 2.2 | 0.9952 | 0.0668 | 2.2 |
| −0.7784 | 0.789 | 2.2 | 0.9563 | 0.0804 | 2.2 |
| −0.749 | 0.7537 | 2.2 | 0.9135 | 0.0963 | 2.2 |
| −0.7157 | 0.7156 | 2.2 | 0.8666 | 0.1146 | 2.2 |
| −0.678 | 0.6753 | 2.2 | 0.818 | 0.1346 | 2.2 |
| −0.6372 | 0.6349 | 2.2 | 0.7677 | 0.1563 | 2.2 |
| −0.5933 | 0.5944 | 2.2 | 0.7156 | 0.1797 | 2.2 |
| −0.5465 | 0.5536 | 2.2 | 0.6617 | 0.2048 | 2.2 |
| −0.4968 | 0.5126 | 2.2 | 0.6061 | 0.2316 | 2.2 |
| −0.4438 | 0.4716 | 2.2 | 0.5487 | 0.2601 | 2.2 |
| −0.3877 | 0.4307 | 2.2 | 0.4896 | 0.2903 | 2.2 |
| −0.3281 | 0.3901 | 2.2 | 0.4288 | 0.3221 | 2.2 |
| −0.2671 | 0.3512 | 2.2 | 0.3682 | 0.3543 | 2.2 |
| −0.2051 | 0.3145 | 2.2 | 0.3079 | 0.3869 | 2.2 |
| −0.1422 | 0.28 | 2.2 | 0.2476 | 0.4198 | 2.2 |
| −0.0782 | 0.2477 | 2.2 | 0.1874 | 0.4527 | 2.2 |
| −0.0131 | 0.2178 | 2.2 | 0.1271 | 0.4856 | 2.2 |
| 0.053 | 0.1903 | 2.2 | 0.0667 | 0.5182 | 2.2 |
| 0.1202 | 0.1652 | 2.2 | 0.0062 | 0.5505 | 2.2 |
| 0.1884 | 0.1421 | 2.2 | −0.0544 | 0.5827 | 2.2 |
| 0.2575 | 0.1211 | 2.2 | −0.115 | 0.6149 | 2.2 |
| 0.3272 | 0.1021 | 2.2 | −0.1755 | 0.6472 | 2.2 |
| 0.3974 | 0.0851 | 2.2 | −0.2361 | 0.6796 | 2.2 |

TABLE 1-continued

| SUCTION SIDE | | | PRESSURE SIDE | | |
|---|---|---|---|---|---|
| X | Y | Z | X | Y | Z |
| 0.4656 | 0.0703 | 2.2 | −0.2945 | 0.711 | 2.2 |
| 0.5319 | 0.0576 | 2.2 | −0.3509 | 0.7413 | 2.2 |
| 0.596 | 0.0466 | 2.2 | −0.4053 | 0.7706 | 2.2 |
| 0.658 | 0.0373 | 2.2 | −0.4576 | 0.7988 | 2.2 |
| 0.7177 | 0.0292 | 2.2 | −0.508 | 0.826 | 2.2 |
| 0.7751 | 0.0223 | 2.2 | −0.5565 | 0.8516 | 2.2 |
| 0.8302 | 0.0163 | 2.2 | −0.6033 | 0.8756 | 2.2 |
| 0.883 | 0.0111 | 2.2 | −0.6462 | 0.8973 | 2.2 |
| 0.931 | 0.0067 | 2.2 | −0.685 | 0.9169 | 2.2 |
| 0.9742 | 0.003 | 2.2 | −0.7197 | 0.9345 | 2.2 |
| 1.0127 | −0.0004 | 2.2 | −0.7503 | 0.95 | 2.2 |
| 1.0486 | −0.0039 | 2.2 | −0.7769 | 0.9633 | 2.2 |
| 1.0798 | −0.0072 | 2.2 | −0.7996 | 0.9741 | 2.2 |
| 1.1038 | −0.0098 | 2.2 | −0.8194 | 0.9825 | 2.2 |
| 1.1229 | −0.0119 | 2.2 | −0.8363 | 0.9888 | 2.2 |
| 1.1373 | −0.0125 | 2.2 | −0.8506 | 0.993 | 2.2 |
| 1.1469 | −0.0076 | 2.2 | −0.8622 | 0.9954 | 2.2 |
| 1.1508 | −0.0029 | 2.2 | −0.8713 | 0.9961 | 2.2 |
| 1.1524 | 0.0006 | 2.2 | −0.8782 | 0.9957 | 2.2 |
| 1.153 | 0.0025 | 2.2 | −0.8837 | 0.9942 | 2.2 |
| 1.1532 | 0.0034 | 2.2 | −0.8878 | 0.9921 | 2.2 |
| −0.8655 | 1.0777 | 3 | 1.1352 | 0.0982 | 3 |
| −0.8676 | 1.0748 | 3 | 1.1353 | 0.0986 | 3 |
| −0.8692 | 1.0703 | 3 | 1.1354 | 0.0995 | 3 |
| −0.8699 | 1.0643 | 3 | 1.1355 | 0.1013 | 3 |
| −0.8693 | 1.0572 | 3 | 1.1353 | 0.1049 | 3 |
| −0.867 | 1.0478 | 3 | 1.1337 | 0.1102 | 3 |
| −0.8627 | 1.0362 | 3 | 1.1273 | 0.118 | 3 |
| −0.856 | 1.0223 | 3 | 1.1147 | 0.1226 | 3 |
| −0.8467 | 1.006 | 3 | 1.0973 | 0.127 | 3 |
| −0.8345 | 0.9873 | 3 | 1.0755 | 0.1327 | 3 |
| −0.8193 | 0.9661 | 3 | 1.0474 | 0.1405 | 3 |
| −0.8007 | 0.9416 | 3 | 1.0151 | 0.1503 | 3 |
| −0.7786 | 0.9137 | 3 | 0.9809 | 0.1617 | 3 |
| −0.7531 | 0.8826 | 3 | 0.9429 | 0.1754 | 3 |
| −0.7238 | 0.8483 | 3 | 0.9009 | 0.1913 | 3 |
| −0.6906 | 0.8113 | 3 | 0.855 | 0.2095 | 3 |
| −0.6532 | 0.772 | 3 | 0.8074 | 0.2294 | 3 |
| −0.6127 | 0.7327 | 3 | 0.7581 | 0.2509 | 3 |
| −0.5694 | 0.6933 | 3 | 0.707 | 0.2741 | 3 |
| −0.5233 | 0.6536 | 3 | 0.6542 | 0.299 | 3 |
| −0.4744 | 0.6137 | 3 | 0.5997 | 0.3255 | 3 |
| −0.4225 | 0.5737 | 3 | 0.5435 | 0.3537 | 3 |
| −0.3675 | 0.534 | 3 | 0.4855 | 0.3835 | 3 |
| −0.3094 | 0.4944 | 3 | 0.4259 | 0.4148 | 3 |
| −0.2498 | 0.4566 | 3 | 0.3665 | 0.4467 | 3 |
| −0.189 | 0.4204 | 3 | 0.3073 | 0.4788 | 3 |
| −0.1271 | 0.3863 | 3 | 0.2483 | 0.5113 | 3 |
| −0.0643 | 0.3545 | 3 | 0.1893 | 0.5438 | 3 |
| −0.0007 | 0.3249 | 3 | 0.1302 | 0.5763 | 3 |
| 0.0638 | 0.2976 | 3 | 0.0711 | 0.6085 | 3 |
| 0.1292 | 0.2725 | 3 | 0.0118 | 0.6406 | 3 |
| 0.1953 | 0.2495 | 3 | −0.0475 | 0.6725 | 3 |
| 0.2621 | 0.2284 | 3 | −0.1068 | 0.7045 | 3 |
| 0.3297 | 0.209 | 3 | −0.1661 | 0.7365 | 3 |
| 0.3979 | 0.1914 | 3 | −0.2253 | 0.7686 | 3 |
| 0.4644 | 0.1759 | 3 | −0.2825 | 0.7998 | 3 |
| 0.5289 | 0.1624 | 3 | −0.3377 | 0.8299 | 3 |
| 0.5914 | 0.1505 | 3 | −0.3909 | 0.859 | 3 |
| 0.6518 | 0.1403 | 3 | −0.4421 | 0.8872 | 3 |
| 0.71 | 0.1313 | 3 | −0.4913 | 0.9142 | 3 |
| 0.766 | 0.1234 | 3 | −0.5388 | 0.9397 | 3 |
| 0.8197 | 0.1164 | 3 | −0.5846 | 0.9636 | 3 |
| 0.8712 | 0.1102 | 3 | −0.6265 | 0.9852 | 3 |
| 0.918 | 0.105 | 3 | −0.6645 | 1.0046 | 3 |
| 0.9602 | 0.1004 | 3 | −0.6984 | 1.0221 | 3 |
| 0.9977 | 0.0963 | 3 | −0.7284 | 1.0376 | 3 |
| 1.0328 | 0.0922 | 3 | −0.7544 | 1.0508 | 3 |
| 1.0631 | 0.0884 | 3 | −0.7766 | 1.0615 | 3 |
| 1.0865 | 0.0853 | 3 | −0.796 | 1.07 | 3 |
| 1.1052 | 0.0829 | 3 | −0.8125 | 1.0764 | 3 |
| 1.1193 | 0.0821 | 3 | −0.8265 | 1.0807 | 3 |
| 1.1288 | 0.0869 | 3 | −0.8379 | 1.083 | 3 |
| 1.1326 | 0.0914 | 3 | −0.8468 | 1.0839 | 3 |
| 1.1343 | 0.0949 | 3 | −0.8536 | 1.0835 | 3 |
| 1.1349 | 0.0967 | 3 | −0.859 | 1.0821 | 3 |

TABLE 1-continued

| SUCTION SIDE | | | PRESSURE SIDE | | |
|---|---|---|---|---|---|
| X | Y | Z | X | Y | Z |
| 1.1351 | 0.0977 | 3 | −0.863 | 1.08 | 3 |
| −0.8398 | 1.1285 | 3.8 | 1.1156 | 0.1399 | 3.8 |
| −0.8419 | 1.1255 | 3.8 | 1.1157 | 0.1403 | 3.8 |
| −0.8434 | 1.1211 | 3.8 | 1.1158 | 0.1412 | 3.8 |
| −0.844 | 1.1152 | 3.8 | 1.116 | 0.1429 | 3.8 |
| −0.8433 | 1.1082 | 3.8 | 1.1158 | 0.1465 | 3.8 |
| −0.8411 | 1.0991 | 3.8 | 1.1143 | 0.1518 | 3.8 |
| −0.8369 | 1.0877 | 3.8 | 1.1083 | 0.1596 | 3.8 |
| −0.8303 | 1.074 | 3.8 | 1.096 | 0.1644 | 3.8 |
| −0.8212 | 1.058 | 3.8 | 1.0789 | 0.169 | 3.8 |
| −0.8094 | 1.0396 | 3.8 | 1.0576 | 0.175 | 3.8 |
| −0.7947 | 1.0187 | 3.8 | 1.0301 | 0.1832 | 3.8 |
| −0.7767 | 0.9945 | 3.8 | 0.9985 | 0.1933 | 3.8 |
| −0.7553 | 0.9669 | 3.8 | 0.9651 | 0.205 | 3.8 |
| −0.7305 | 0.9362 | 3.8 | 0.9279 | 0.219 | 3.8 |
| −0.7021 | 0.9025 | 3.8 | 0.8868 | 0.2353 | 3.8 |
| −0.6698 | 0.8662 | 3.8 | 0.842 | 0.2538 | 3.8 |
| −0.6333 | 0.8277 | 3.8 | 0.7954 | 0.274 | 3.8 |
| −0.594 | 0.7889 | 3.8 | 0.7472 | 0.2959 | 3.8 |
| −0.5519 | 0.75 | 3.8 | 0.6972 | 0.3193 | 3.8 |
| −0.5071 | 0.7106 | 3.8 | 0.6456 | 0.3445 | 3.8 |
| −0.4594 | 0.671 | 3.8 | 0.5923 | 0.3712 | 3.8 |
| −0.4088 | 0.6313 | 3.8 | 0.5374 | 0.3996 | 3.8 |
| −0.355 | 0.5916 | 3.8 | 0.4808 | 0.4296 | 3.8 |
| −0.2981 | 0.5521 | 3.8 | 0.4225 | 0.4611 | 3.8 |
| −0.2399 | 0.5142 | 3.8 | 0.3645 | 0.4931 | 3.8 |
| −0.1808 | 0.4781 | 3.8 | 0.3066 | 0.5254 | 3.8 |
| −0.1207 | 0.4441 | 3.8 | 0.2489 | 0.558 | 3.8 |
| −0.0596 | 0.4121 | 3.8 | 0.1912 | 0.5906 | 3.8 |
| 0.0024 | 0.3823 | 3.8 | 0.1336 | 0.6233 | 3.8 |
| 0.0654 | 0.3546 | 3.8 | 0.0758 | 0.6557 | 3.8 |
| 0.1294 | 0.329 | 3.8 | 0.0179 | 0.6879 | 3.8 |
| 0.1943 | 0.3052 | 3.8 | −0.0401 | 0.72 | 3.8 |
| 0.26 | 0.2833 | 3.8 | −0.0981 | 0.7521 | 3.8 |
| 0.3264 | 0.2631 | 3.8 | −0.156 | 0.7843 | 3.8 |
| 0.3934 | 0.2447 | 3.8 | −0.2139 | 0.8166 | 3.8 |
| 0.4584 | 0.2284 | 3.8 | −0.2697 | 0.8479 | 3.8 |
| 0.5216 | 0.214 | 3.8 | −0.3236 | 0.8782 | 3.8 |
| 0.5828 | 0.2013 | 3.8 | −0.3756 | 0.9075 | 3.8 |
| 0.6419 | 0.1901 | 3.8 | −0.4256 | 0.9357 | 3.8 |
| 0.699 | 0.1802 | 3.8 | −0.4737 | 0.9629 | 3.8 |
| 0.7538 | 0.1714 | 3.8 | −0.52 | 0.9886 | 3.8 |
| 0.8065 | 0.1635 | 3.8 | −0.5647 | 1.0128 | 3.8 |
| 0.8569 | 0.1565 | 3.8 | −0.6056 | 1.0346 | 3.8 |
| 0.9029 | 0.1504 | 3.8 | −0.6427 | 1.0543 | 3.8 |
| 0.9442 | 0.1451 | 3.8 | −0.676 | 1.0717 | 3.8 |
| 0.9809 | 0.1403 | 3.8 | −0.7053 | 1.0871 | 3.8 |
| 1.0153 | 0.1356 | 3.8 | −0.7308 | 1.1003 | 3.8 |
| 1.0451 | 0.1313 | 3.8 | −0.7526 | 1.111 | 3.8 |
| 1.068 | 0.1279 | 3.8 | −0.7715 | 1.1196 | 3.8 |
| 1.0864 | 0.1251 | 3.8 | −0.7877 | 1.1261 | 3.8 |
| 1.1001 | 0.1243 | 3.8 | −0.8014 | 1.1305 | 3.8 |
| 1.1094 | 0.129 | 3.8 | −0.8126 | 1.1331 | 3.8 |
| 1.1131 | 0.1334 | 3.8 | −0.8213 | 1.1341 | 3.8 |
| 1.1147 | 0.1367 | 3.8 | −0.828 | 1.1338 | 3.8 |
| 1.1153 | 0.1385 | 3.8 | −0.8334 | 1.1326 | 3.8 |
| 1.1155 | 0.1394 | 3.8 | −0.8373 | 1.1306 | 3.8 |
| −0.8124 | 1.1197 | 4.6 | 1.0945 | 0.122 | 4.6 |
| −0.8144 | 1.1169 | 4.6 | 1.0946 | 0.1224 | 4.6 |
| −0.816 | 1.1125 | 4.6 | 1.0947 | 0.1233 | 4.6 |
| −0.8166 | 1.1068 | 4.6 | 1.0949 | 0.125 | 4.6 |
| −0.816 | 1.0999 | 4.6 | 1.0948 | 0.1285 | 4.6 |
| −0.8139 | 1.0908 | 4.6 | 1.0934 | 0.1337 | 4.6 |
| −0.8099 | 1.0796 | 4.6 | 1.0877 | 0.1415 | 4.6 |
| −0.8037 | 1.0661 | 4.6 | 1.0758 | 0.1466 | 4.6 |
| −0.795 | 1.0502 | 4.6 | 1.0591 | 0.1514 | 4.6 |
| −0.7838 | 1.0318 | 4.6 | 1.0383 | 0.1576 | 4.6 |
| −0.7698 | 1.011 | 4.6 | 1.0114 | 0.1661 | 4.6 |
| −0.7526 | 0.9868 | 4.6 | 0.9805 | 0.1766 | 4.6 |
| −0.7322 | 0.9593 | 4.6 | 0.948 | 0.1887 | 4.6 |
| −0.7083 | 0.9287 | 4.6 | 0.9116 | 0.2032 | 4.6 |
| −0.6808 | 0.8951 | 4.6 | 0.8716 | 0.2199 | 4.6 |
| −0.6495 | 0.8589 | 4.6 | 0.8279 | 0.2389 | 4.6 |
| −0.6141 | 0.8204 | 4.6 | 0.7826 | 0.2596 | 4.6 |
| −0.576 | 0.7818 | 4.6 | 0.7356 | 0.2819 | 4.6 |
| −0.5352 | 0.7428 | 4.6 | 0.687 | 0.3058 | 4.6 |

TABLE 1-continued

| SUCTION SIDE | | | PRESSURE SIDE | | |
|---|---|---|---|---|---|
| X | Y | Z | X | Y | Z |
| −0.4917 | 0.7035 | 4.6 | 0.6367 | 0.3314 | 4.6 |
| −0.4454 | 0.6639 | 4.6 | 0.5849 | 0.3586 | 4.6 |
| −0.3963 | 0.6241 | 4.6 | 0.5314 | 0.3874 | 4.6 |
| −0.3441 | 0.5844 | 4.6 | 0.4763 | 0.4178 | 4.6 |
| −0.2888 | 0.5449 | 4.6 | 0.4196 | 0.4497 | 4.6 |
| −0.2322 | 0.5068 | 4.6 | 0.3631 | 0.4821 | 4.6 |
| −0.1744 | 0.4705 | 4.6 | 0.3068 | 0.5147 | 4.6 |
| −0.1157 | 0.4362 | 4.6 | 0.2506 | 0.5476 | 4.6 |
| −0.056 | 0.4039 | 4.6 | 0.1945 | 0.5805 | 4.6 |
| 0.0046 | 0.3738 | 4.6 | 0.1383 | 0.6134 | 4.6 |
| 0.0661 | 0.3458 | 4.6 | 0.082 | 0.6461 | 4.6 |
| 0.1286 | 0.3199 | 4.6 | 0.0256 | 0.6785 | 4.6 |
| 0.192 | 0.2958 | 4.6 | −0.0309 | 0.7108 | 4.6 |
| 0.2561 | 0.2736 | 4.6 | −0.0874 | 0.7431 | 4.6 |
| 0.321 | 0.253 | 4.6 | −0.1439 | 0.7754 | 4.6 |
| 0.3865 | 0.234 | 4.6 | −0.2004 | 0.8077 | 4.6 |
| 0.4503 | 0.2172 | 4.6 | −0.2549 | 0.8391 | 4.6 |
| 0.5122 | 0.2023 | 4.6 | −0.3075 | 0.8695 | 4.6 |
| 0.5721 | 0.1891 | 4.6 | −0.3582 | 0.8988 | 4.6 |
| 0.6301 | 0.1774 | 4.6 | −0.4071 | 0.927 | 4.6 |
| 0.686 | 0.167 | 4.6 | −0.454 | 0.9541 | 4.6 |
| 0.7398 | 0.1577 | 4.6 | −0.4993 | 0.9799 | 4.6 |
| 0.7914 | 0.1493 | 4.6 | −0.5429 | 1.0041 | 4.6 |
| 0.8409 | 0.1417 | 4.6 | −0.5829 | 1.026 | 4.6 |
| 0.8859 | 0.1351 | 4.6 | −0.6191 | 1.0456 | 4.6 |
| 0.9265 | 0.1294 | 4.6 | −0.6516 | 1.063 | 4.6 |
| 0.9625 | 0.1243 | 4.6 | −0.6804 | 1.0782 | 4.6 |
| 0.9963 | 0.1192 | 4.6 | −0.7054 | 1.0912 | 4.6 |
| 1.0255 | 0.1144 | 4.6 | −0.7268 | 1.1018 | 4.6 |
| 1.0479 | 0.1107 | 4.6 | −0.7453 | 1.1103 | 4.6 |
| 1.0659 | 0.1078 | 4.6 | −0.7612 | 1.1168 | 4.6 |
| 1.0793 | 0.1069 | 4.6 | −0.7746 | 1.1213 | 4.6 |
| 1.0883 | 0.1114 | 4.6 | −0.7855 | 1.1239 | 4.6 |
| 1.092 | 0.1157 | 4.6 | −0.7941 | 1.125 | 4.6 |
| 1.0936 | 0.1189 | 4.6 | −0.8006 | 1.1249 | 4.6 |
| 1.0942 | 0.1207 | 4.6 | −0.8059 | 1.1237 | 4.6 |
| 1.0944 | 0.1216 | 4.6 | −0.8099 | 1.1218 | 4.6 |
| −0.7852 | 1.0647 | 5.4 | 1.0733 | 0.0571 | 5.4 |
| −0.7872 | 1.062 | 5.4 | 1.0734 | 0.0575 | 5.4 |
| −0.7888 | 1.0577 | 5.4 | 1.0735 | 0.0584 | 5.4 |
| −0.7893 | 1.052 | 5.4 | 1.0737 | 0.0601 | 5.4 |
| −0.7888 | 1.0453 | 5.4 | 1.0736 | 0.0635 | 5.4 |
| −0.7867 | 1.0364 | 5.4 | 1.0724 | 0.0686 | 5.4 |
| −0.7829 | 1.0254 | 5.4 | 1.0669 | 0.0764 | 5.4 |
| −0.777 | 1.012 | 5.4 | 1.0554 | 0.0817 | 5.4 |
| −0.7688 | 0.9961 | 5.4 | 1.0391 | 0.0867 | 5.4 |
| −0.7582 | 0.9779 | 5.4 | 1.0187 | 0.0931 | 5.4 |
| −0.745 | 0.957 | 5.4 | 0.9924 | 0.1018 | 5.4 |
| −0.7288 | 0.9327 | 5.4 | 0.9623 | 0.1126 | 5.4 |
| −0.7095 | 0.9052 | 5.4 | 0.9305 | 0.125 | 5.4 |
| −0.6867 | 0.8746 | 5.4 | 0.8951 | 0.1398 | 5.4 |
| −0.6602 | 0.8412 | 5.4 | 0.856 | 0.1568 | 5.4 |
| −0.6298 | 0.8053 | 5.4 | 0.8134 | 0.1762 | 5.4 |
| −0.5955 | 0.7672 | 5.4 | 0.7691 | 0.1972 | 5.4 |
| −0.5586 | 0.7286 | 5.4 | 0.7233 | 0.2198 | 5.4 |
| −0.5191 | 0.6896 | 5.4 | 0.676 | 0.2441 | 5.4 |
| −0.477 | 0.6503 | 5.4 | 0.627 | 0.27 | 5.4 |
| −0.4321 | 0.6106 | 5.4 | 0.5765 | 0.2975 | 5.4 |
| −0.3845 | 0.5709 | 5.4 | 0.5244 | 0.3267 | 5.4 |
| −0.3338 | 0.5311 | 5.4 | 0.4708 | 0.3574 | 5.4 |
| −0.2801 | 0.4914 | 5.4 | 0.4156 | 0.3897 | 5.4 |
| −0.225 | 0.4532 | 5.4 | 0.3607 | 0.4223 | 5.4 |
| −0.1687 | 0.4167 | 5.4 | 0.3059 | 0.4553 | 5.4 |
| −0.1115 | 0.3822 | 5.4 | 0.2513 | 0.4885 | 5.4 |
| −0.0533 | 0.3496 | 5.4 | 0.1966 | 0.5217 | 5.4 |
| 0.0059 | 0.3192 | 5.4 | 0.142 | 0.5549 | 5.4 |
| 0.066 | 0.2909 | 5.4 | 0.0872 | 0.5879 | 5.4 |
| 0.127 | 0.2646 | 5.4 | 0.0323 | 0.6206 | 5.4 |
| 0.1889 | 0.2401 | 5.4 | −0.0227 | 0.6532 | 5.4 |
| 0.2516 | 0.2174 | 5.4 | −0.0778 | 0.6857 | 5.4 |
| 0.3151 | 0.1963 | 5.4 | −0.1328 | 0.7182 | 5.4 |
| 0.3792 | 0.1768 | 5.4 | −0.1877 | 0.7509 | 5.4 |
| 0.4416 | 0.1594 | 5.4 | −0.2408 | 0.7825 | 5.4 |
| 0.5022 | 0.144 | 5.4 | −0.2921 | 0.8131 | 5.4 |
| 0.561 | 0.1302 | 5.4 | −0.3415 | 0.8426 | 5.4 |
| 0.6178 | 0.1179 | 5.4 | −0.3891 | 0.8709 | 5.4 |

TABLE 1-continued

| SUCTION SIDE | | | PRESSURE SIDE | | |
|---|---|---|---|---|---|
| X | Y | Z | X | Y | Z |
| 0.6726 | 0.1069 | 5.4 | −0.4349 | 0.8981 | 5.4 |
| 0.7253 | 0.097 | 5.4 | −0.4789 | 0.9241 | 5.4 |
| 0.7759 | 0.088 | 5.4 | −0.5213 | 0.9488 | 5.4 |
| 0.8244 | 0.0799 | 5.4 | −0.5602 | 0.9709 | 5.4 |
| 0.8686 | 0.0728 | 5.4 | −0.5956 | 0.9905 | 5.4 |
| 0.9083 | 0.0667 | 5.4 | −0.6275 | 1.0077 | 5.4 |
| 0.9437 | 0.0611 | 5.4 | −0.6557 | 1.0227 | 5.4 |
| 0.9767 | 0.0555 | 5.4 | −0.6803 | 1.0355 | 5.4 |
| 1.0054 | 0.0504 | 5.4 | −0.7013 | 1.046 | 5.4 |
| 1.0274 | 0.0464 | 5.4 | −0.7194 | 1.0544 | 5.4 |
| 1.045 | 0.0433 | 5.4 | −0.735 | 1.0609 | 5.4 |
| 1.0582 | 0.0423 | 5.4 | −0.748 | 1.0654 | 5.4 |
| 1.0671 | 0.0467 | 5.4 | −0.7588 | 1.0682 | 5.4 |
| 1.0707 | 0.0509 | 5.4 | −0.7672 | 1.0695 | 5.4 |
| 1.0723 | 0.0541 | 5.4 | −0.7736 | 1.0695 | 5.4 |
| 1.0729 | 0.0558 | 5.4 | −0.7788 | 1.0686 | 5.4 |
| 1.0732 | 0.0567 | 5.4 | −0.7827 | 1.0668 | 5.4 |
| −0.7566 | 0.9792 | 6.2 | 1.0517 | −0.0417 | 6.2 |
| −0.7586 | 0.9765 | 6.2 | 1.0518 | −0.0413 | 6.2 |
| −0.76 | 0.9723 | 6.2 | 1.052 | −0.0404 | 6.2 |
| −0.7604 | 0.9667 | 6.2 | 1.0522 | −0.0388 | 6.2 |
| −0.7597 | 0.9601 | 6.2 | 1.0522 | −0.0354 | 6.2 |
| −0.7575 | 0.9515 | 6.2 | 1.051 | −0.0303 | 6.2 |
| −0.7535 | 0.9408 | 6.2 | 1.0458 | −0.0225 | 6.2 |
| −0.7475 | 0.9277 | 6.2 | 1.0346 | −0.0171 | 6.2 |
| −0.7392 | 0.9124 | 6.2 | 1.0186 | −0.0121 | 6.2 |
| −0.7285 | 0.8947 | 6.2 | 0.9986 | −0.0056 | 6.2 |
| −0.7153 | 0.8745 | 6.2 | 0.9728 | 0.0031 | 6.2 |
| −0.6992 | 0.8509 | 6.2 | 0.9433 | 0.0138 | 6.2 |
| −0.68 | 0.824 | 6.2 | 0.9121 | 0.026 | 6.2 |
| −0.6575 | 0.7942 | 6.2 | 0.8772 | 0.0405 | 6.2 |
| −0.6313 | 0.7618 | 6.2 | 0.8388 | 0.0572 | 6.2 |
| −0.6015 | 0.727 | 6.2 | 0.7969 | 0.0761 | 6.2 |
| −0.5677 | 0.6901 | 6.2 | 0.7534 | 0.0966 | 6.2 |
| −0.5316 | 0.6524 | 6.2 | 0.7083 | 0.1187 | 6.2 |
| −0.493 | 0.6142 | 6.2 | 0.6617 | 0.1424 | 6.2 |
| −0.4518 | 0.5755 | 6.2 | 0.6135 | 0.1676 | 6.2 |
| −0.408 | 0.5365 | 6.2 | 0.5638 | 0.1945 | 6.2 |
| −0.3614 | 0.4972 | 6.2 | 0.5126 | 0.223 | 6.2 |
| −0.3119 | 0.4577 | 6.2 | 0.4599 | 0.2531 | 6.2 |
| −0.2595 | 0.4183 | 6.2 | 0.4056 | 0.2848 | 6.2 |
| −0.206 | 0.3803 | 6.2 | 0.3517 | 0.3169 | 6.2 |
| −0.1517 | 0.344 | 6.2 | 0.298 | 0.3494 | 6.2 |
| −0.0965 | 0.3095 | 6.2 | 0.2445 | 0.3822 | 6.2 |
| −0.0404 | 0.2768 | 6.2 | 0.191 | 0.4152 | 6.2 |
| 0.0167 | 0.2459 | 6.2 | 0.1377 | 0.4483 | 6.2 |
| 0.0747 | 0.217 | 6.2 | 0.0843 | 0.4813 | 6.2 |
| 0.1336 | 0.1898 | 6.2 | 0.0308 | 0.5143 | 6.2 |
| 0.1933 | 0.1643 | 6.2 | −0.0226 | 0.5473 | 6.2 |
| 0.2538 | 0.1404 | 6.2 | −0.076 | 0.5803 | 6.2 |
| 0.315 | 0.1179 | 6.2 | −0.1293 | 0.6135 | 6.2 |
| 0.377 | 0.0969 | 6.2 | −0.1824 | 0.6469 | 6.2 |
| 0.4375 | 0.0779 | 6.2 | −0.2337 | 0.6794 | 6.2 |
| 0.4962 | 0.0608 | 6.2 | −0.2831 | 0.7109 | 6.2 |
| 0.5532 | 0.0454 | 6.2 | −0.3307 | 0.7414 | 6.2 |
| 0.6083 | 0.0314 | 6.2 | −0.3765 | 0.7707 | 6.2 |
| 0.6614 | 0.0188 | 6.2 | −0.4205 | 0.799 | 6.2 |
| 0.7126 | 0.0073 | 6.2 | −0.4628 | 0.8262 | 6.2 |
| 0.7618 | −0.0031 | 6.2 | −0.5033 | 0.8522 | 6.2 |
| 0.809 | −0.0127 | 6.2 | −0.5405 | 0.8757 | 6.2 |
| 0.8519 | −0.021 | 6.2 | −0.5743 | 0.8966 | 6.2 |
| 0.8906 | −0.0283 | 6.2 | −0.6047 | 0.915 | 6.2 |
| 0.9249 | −0.0349 | 6.2 | −0.6318 | 0.931 | 6.2 |
| 0.9571 | −0.0412 | 6.2 | −0.6553 | 0.9446 | 6.2 |
| 0.985 | −0.0469 | 6.2 | −0.6754 | 0.9558 | 6.2 |
| 1.0064 | −0.0514 | 6.2 | −0.6928 | 0.965 | 6.2 |
| 1.0235 | −0.0549 | 6.2 | −0.7077 | 0.9722 | 6.2 |
| 1.0365 | −0.0562 | 6.2 | −0.7203 | 0.9774 | 6.2 |
| 1.0455 | −0.052 | 6.2 | −0.7306 | 0.9808 | 6.2 |
| 1.0491 | −0.0478 | 6.2 | −0.7387 | 0.9826 | 6.2 |
| 1.0508 | −0.0447 | 6.2 | −0.745 | 0.9831 | 6.2 |
| 1.0514 | −0.043 | 6.2 | −0.7502 | 0.9826 | 6.2 |
| 1.0516 | −0.0421 | 6.2 | −0.7541 | 0.9811 | 6.2 |
| −0.7289 | 0.8649 | 7 | 1.0312 | −0.1694 | 7 |
| −0.7309 | 0.8623 | 7 | 1.0313 | −0.169 | 7 |
| −0.7322 | 0.8582 | 7 | 1.0315 | −0.1682 | 7 |

TABLE 1-continued

| SUCTION SIDE | | | PRESSURE SIDE | | |
|---|---|---|---|---|---|
| X | Y | Z | X | Y | Z |
| −0.7326 | 0.8527 | 7 | 1.0317 | −0.1665 | 7 |
| −0.7318 | 0.8462 | 7 | 1.0317 | −0.1633 | 7 |
| −0.7297 | 0.8378 | 7 | 1.0307 | −0.1582 | 7 |
| −0.7258 | 0.8272 | 7 | 1.0257 | −0.1505 | 7 |
| −0.7199 | 0.8144 | 7 | 1.0149 | −0.1448 | 7 |
| −0.7118 | 0.7993 | 7 | 0.9992 | −0.1397 | 7 |
| −0.7014 | 0.7819 | 7 | 0.9797 | −0.133 | 7 |
| −0.6886 | 0.7619 | 7 | 0.9545 | −0.1241 | 7 |
| −0.673 | 0.7386 | 7 | 0.9256 | −0.1132 | 7 |
| −0.6543 | 0.7122 | 7 | 0.895 | −0.1009 | 7 |
| −0.6323 | 0.6828 | 7 | 0.8609 | −0.0863 | 7 |
| −0.6068 | 0.6507 | 7 | 0.8233 | −0.0695 | 7 |
| −0.5777 | 0.6162 | 7 | 0.7823 | −0.0505 | 7 |
| −0.5449 | 0.5795 | 7 | 0.7397 | −0.0299 | 7 |
| −0.5098 | 0.5421 | 7 | 0.6956 | −0.0078 | 7 |
| −0.4723 | 0.5041 | 7 | 0.6499 | 0.0159 | 7 |
| −0.4323 | 0.4657 | 7 | 0.6028 | 0.0412 | 7 |
| −0.3898 | 0.4268 | 7 | 0.5542 | 0.0681 | 7 |
| −0.3447 | 0.3876 | 7 | 0.5041 | 0.0967 | 7 |
| −0.2968 | 0.3483 | 7 | 0.4526 | 0.1268 | 7 |
| −0.246 | 0.3088 | 7 | 0.3996 | 0.1585 | 7 |
| −0.1941 | 0.2707 | 7 | 0.3469 | 0.1906 | 7 |
| −0.141 | 0.234 | 7 | 0.2945 | 0.2232 | 7 |
| −0.0871 | 0.1991 | 7 | 0.2422 | 0.2561 | 7 |
| −0.0324 | 0.1659 | 7 | 0.1901 | 0.2892 | 7 |
| 0.0232 | 0.1345 | 7 | 0.1381 | 0.3224 | 7 |
| 0.0796 | 0.105 | 7 | 0.0861 | 0.3557 | 7 |
| 0.1369 | 0.0771 | 7 | 0.0341 | 0.3889 | 7 |
| 0.1949 | 0.0509 | 7 | −0.0179 | 0.4222 | 7 |
| 0.2537 | 0.0262 | 7 | −0.0698 | 0.4556 | 7 |
| 0.3131 | 0.003 | 7 | −0.1216 | 0.4893 | 7 |
| 0.3732 | −0.0189 | 7 | −0.1732 | 0.5231 | 7 |
| 0.4319 | −0.0388 | 7 | −0.2229 | 0.5561 | 7 |
| 0.4891 | −0.0569 | 7 | −0.2708 | 0.5881 | 7 |
| 0.5446 | −0.0733 | 7 | −0.317 | 0.6191 | 7 |
| 0.5983 | −0.0883 | 7 | −0.3613 | 0.649 | 7 |
| 0.6502 | −0.1019 | 7 | −0.4039 | 0.6779 | 7 |
| 0.7002 | −0.1143 | 7 | −0.4447 | 0.7057 | 7 |
| 0.7482 | −0.1257 | 7 | −0.4839 | 0.7323 | 7 |
| 0.7942 | −0.1362 | 7 | −0.5198 | 0.7564 | 7 |
| 0.8362 | −0.1454 | 7 | −0.5524 | 0.7779 | 7 |
| 0.8739 | −0.1534 | 7 | −0.5818 | 0.7969 | 7 |
| 0.9075 | −0.1606 | 7 | −0.6079 | 0.8134 | 7 |
| 0.9389 | −0.1675 | 7 | −0.6306 | 0.8275 | 7 |
| 0.9662 | −0.1737 | 7 | −0.6499 | 0.8393 | 7 |
| 0.9871 | −0.1784 | 7 | −0.6667 | 0.8489 | 7 |
| 1.0038 | −0.1823 | 7 | −0.6811 | 0.8565 | 7 |
| 1.0165 | −0.1835 | 7 | −0.6933 | 0.862 | 7 |
| 1.0252 | −0.1794 | 7 | −0.7033 | 0.8657 | 7 |
| 1.0287 | −0.1753 | 7 | −0.7113 | 0.8677 | 7 |
| 1.0303 | −0.1723 | 7 | −0.7174 | 0.8685 | 7 |
| 1.0309 | −0.1706 | 7 | −0.7225 | 0.8681 | 7 |
| 1.0311 | −0.1698 | 7 | −0.7264 | 0.8668 | 7 |
| −0.7004 | 0.7389 | 7.8 | 1.0079 | −0.3011 | 7.8 |
| −0.7023 | 0.7363 | 7.8 | 1.008 | −0.3007 | 7.8 |
| −0.7036 | 0.7322 | 7.8 | 1.0081 | −0.2999 | 7.8 |
| −0.7038 | 0.7269 | 7.8 | 1.0083 | −0.2983 | 7.8 |
| −0.7029 | 0.7206 | 7.8 | 1.0084 | −0.2951 | 7.8 |
| −0.7007 | 0.7125 | 7.8 | 1.0074 | −0.2901 | 7.8 |
| −0.6967 | 0.7022 | 7.8 | 1.0027 | −0.2824 | 7.8 |
| −0.6909 | 0.6898 | 7.8 | 0.9922 | −0.2766 | 7.8 |
| −0.6829 | 0.6753 | 7.8 | 0.9769 | −0.2716 | 7.8 |
| −0.6726 | 0.6585 | 7.8 | 0.9577 | −0.2652 | 7.8 |
| −0.66 | 0.6391 | 7.8 | 0.9329 | −0.2565 | 7.8 |
| −0.6446 | 0.6165 | 7.8 | 0.9045 | −0.246 | 7.8 |
| −0.6263 | 0.5909 | 7.8 | 0.8745 | −0.2341 | 7.8 |
| −0.6048 | 0.5626 | 7.8 | 0.8409 | −0.22 | 7.8 |
| −0.58 | 0.5316 | 7.8 | 0.804 | −0.2039 | 7.8 |
| −0.5517 | 0.498 | 7.8 | 0.7636 | −0.1855 | 7.8 |
| −0.5198 | 0.4621 | 7.8 | 0.7217 | −0.1657 | 7.8 |
| −0.4856 | 0.4254 | 7.8 | 0.6783 | −0.1443 | 7.8 |
| −0.449 | 0.3879 | 7.8 | 0.6334 | −0.1213 | 7.8 |
| −0.41 | 0.3499 | 7.8 | 0.5871 | −0.0968 | 7.8 |
| −0.3687 | 0.3114 | 7.8 | 0.5393 | −0.0707 | 7.8 |
| −0.3249 | 0.2727 | 7.8 | 0.49 | −0.043 | 7.8 |
| −0.2788 | 0.2339 | 7.8 | 0.4394 | −0.0136 | 7.8 |

TABLE 1-continued

| SUCTION SIDE | | | PRESSURE SIDE | | |
|---|---|---|---|---|---|
| X | Y | Z | X | Y | Z |
| −0.2301 | 0.195 | 7.8 | 0.3874 | 0.0173 | 7.8 |
| −0.1805 | 0.1575 | 7.8 | 0.3358 | 0.0489 | 7.8 |
| −0.1299 | 0.1213 | 7.8 | 0.2844 | 0.0809 | 7.8 |
| −0.0784 | 0.0866 | 7.8 | 0.2334 | 0.1133 | 7.8 |
| −0.0259 | 0.0533 | 7.8 | 0.1825 | 0.1461 | 7.8 |
| 0.0277 | 0.0215 | 7.8 | 0.1319 | 0.1791 | 7.8 |
| 0.0823 | −0.0088 | 7.8 | 0.0813 | 0.2123 | 7.8 |
| 0.138 | −0.0377 | 7.8 | 0.0308 | 0.2456 | 7.8 |
| 0.1946 | −0.0651 | 7.8 | −0.0195 | 0.2792 | 7.8 |
| 0.2519 | −0.091 | 7.8 | −0.0697 | 0.313 | 7.8 |
| 0.3098 | −0.1156 | 7.8 | −0.1197 | 0.3472 | 7.8 |
| 0.3682 | −0.1387 | 7.8 | −0.1694 | 0.3816 | 7.8 |
| 0.4252 | −0.1599 | 7.8 | −0.2173 | 0.4153 | 7.8 |
| 0.4807 | −0.1792 | 7.8 | −0.2633 | 0.448 | 7.8 |
| 0.5345 | −0.1969 | 7.8 | −0.3075 | 0.4798 | 7.8 |
| 0.5866 | −0.2129 | 7.8 | −0.3499 | 0.5106 | 7.8 |
| 0.6369 | −0.2276 | 7.8 | −0.3906 | 0.5404 | 7.8 |
| 0.6854 | −0.2411 | 7.8 | −0.4296 | 0.5691 | 7.8 |
| 0.732 | −0.2535 | 7.8 | −0.467 | 0.5967 | 7.8 |
| 0.7767 | −0.2649 | 7.8 | −0.5011 | 0.6218 | 7.8 |
| 0.8175 | −0.2748 | 7.8 | −0.532 | 0.6444 | 7.8 |
| 0.8543 | −0.2835 | 7.8 | −0.5599 | 0.6644 | 7.8 |
| 0.8869 | −0.2912 | 7.8 | −0.5846 | 0.6818 | 7.8 |
| 0.9175 | −0.2985 | 7.8 | −0.6062 | 0.6968 | 7.8 |
| 0.944 | −0.3049 | 7.8 | −0.6245 | 0.7092 | 7.8 |
| 0.9644 | −0.3099 | 7.8 | −0.6404 | 0.7196 | 7.8 |
| 0.9808 | −0.3138 | 7.8 | −0.6541 | 0.7277 | 7.8 |
| 0.9932 | −0.315 | 7.8 | −0.6657 | 0.7338 | 7.8 |
| 1.0018 | −0.3109 | 7.8 | −0.6753 | 0.738 | 7.8 |
| 1.0053 | −0.3069 | 7.8 | −0.683 | 0.7405 | 7.8 |
| 1.0069 | −0.3039 | 7.8 | −0.6889 | 0.7416 | 7.8 |
| 1.0075 | −0.3023 | 7.8 | −0.694 | 0.7416 | 7.8 |
| 1.0077 | −0.3015 | 7.8 | −0.6979 | 0.7406 | 7.8 |
| −0.6892 | 0.6951 | 8.116 | 0.9976 | −0.3468 | 8.116 |
| −0.6911 | 0.6926 | 8.116 | 0.9977 | −0.3464 | 8.116 |
| −0.6923 | 0.6885 | 8.116 | 0.9979 | −0.3456 | 8.116 |
| −0.6925 | 0.6833 | 8.116 | 0.9981 | −0.344 | 8.116 |
| −0.6916 | 0.677 | 8.116 | 0.9982 | −0.3408 | 8.116 |
| −0.6894 | 0.6689 | 8.116 | 0.9973 | −0.3359 | 8.116 |
| −0.6855 | 0.6587 | 8.116 | 0.9927 | −0.3282 | 8.116 |
| −0.6796 | 0.6464 | 8.116 | 0.9823 | −0.3224 | 8.116 |
| −0.6717 | 0.6319 | 8.116 | 0.967 | −0.3175 | 8.116 |
| −0.6615 | 0.6152 | 8.116 | 0.948 | −0.3111 | 8.116 |
| −0.649 | 0.5959 | 8.116 | 0.9234 | −0.3025 | 8.116 |
| −0.6338 | 0.5735 | 8.116 | 0.8953 | −0.2921 | 8.116 |
| −0.6156 | 0.548 | 8.116 | 0.8654 | −0.2804 | 8.116 |
| −0.5942 | 0.5197 | 8.116 | 0.8322 | −0.2665 | 8.116 |
| −0.5696 | 0.4887 | 8.116 | 0.7954 | −0.2506 | 8.116 |
| −0.5416 | 0.4553 | 8.116 | 0.7553 | −0.2324 | 8.116 |
| −0.5101 | 0.4194 | 8.116 | 0.7137 | −0.2129 | 8.116 |
| −0.4765 | 0.3829 | 8.116 | 0.6707 | −0.1918 | 8.116 |
| −0.4406 | 0.3457 | 8.116 | 0.6261 | −0.1691 | 8.116 |
| −0.4023 | 0.3079 | 8.116 | 0.5801 | −0.1449 | 8.116 |
| −0.3617 | 0.2695 | 8.116 | 0.5327 | −0.119 | 8.116 |
| −0.3186 | 0.2308 | 8.116 | 0.4838 | −0.0916 | 8.116 |
| −0.2728 | 0.1918 | 8.116 | 0.4336 | −0.0625 | 8.116 |
| −0.2243 | 0.1526 | 8.116 | 0.382 | −0.0318 | 8.116 |
| −0.1748 | 0.1146 | 8.116 | 0.3309 | −0.0005 | 8.116 |
| −0.1244 | 0.0781 | 8.116 | 0.28 | 0.0313 | 8.116 |
| −0.0731 | 0.0431 | 8.116 | 0.2294 | 0.0636 | 8.116 |
| −0.0211 | 0.0097 | 8.116 | 0.1791 | 0.0962 | 8.116 |
| 0.0318 | −0.0222 | 8.116 | 0.1289 | 0.1291 | 8.116 |
| 0.0855 | −0.0524 | 8.116 | 0.0789 | 0.1622 | 8.116 |
| 0.14 | −0.0812 | 8.116 | 0.0291 | 0.1956 | 8.116 |
| 0.1953 | −0.1085 | 8.116 | −0.0207 | 0.2292 | 8.116 |
| 0.2513 | −0.1344 | 8.116 | −0.0702 | 0.2631 | 8.116 |
| 0.3081 | −0.159 | 8.116 | −0.1194 | 0.2974 | 8.116 |
| 0.3655 | −0.1823 | 8.116 | −0.1684 | 0.332 | 8.116 |
| 0.4216 | −0.2037 | 8.116 | −0.2155 | 0.3659 | 8.116 |
| 0.4763 | −0.2233 | 8.116 | −0.2608 | 0.3989 | 8.116 |
| 0.5295 | −0.2411 | 8.116 | −0.3042 | 0.431 | 8.116 |
| 0.5809 | −0.2575 | 8.116 | −0.3458 | 0.4622 | 8.116 |
| 0.6307 | −0.2724 | 8.116 | −0.3858 | 0.4923 | 8.116 |
| 0.6786 | −0.286 | 8.116 | −0.424 | 0.5214 | 8.116 |
| 0.7247 | −0.2986 | 8.116 | −0.4605 | 0.5493 | 8.116 |
| 0.769 | −0.3101 | 8.116 | −0.4939 | 0.5748 | 8.116 |

TABLE 1-continued

| SUCTION SIDE | | | PRESSURE SIDE | | |
|---|---|---|---|---|---|
| X | Y | Z | X | Y | Z |
| 0.8093 | −0.3202 | 8.116 | −0.5242 | 0.5978 | 8.116 |
| 0.8456 | −0.329 | 8.116 | −0.5514 | 0.6182 | 8.116 |
| 0.878 | −0.3368 | 8.116 | −0.5756 | 0.6359 | 8.116 |
| 0.9082 | −0.3442 | 8.116 | −0.5967 | 0.6512 | 8.116 |
| 0.9345 | −0.3507 | 8.116 | −0.6146 | 0.664 | 8.116 |
| 0.9547 | −0.3556 | 8.116 | −0.6302 | 0.6745 | 8.116 |
| 0.9708 | −0.3595 | 8.116 | −0.6436 | 0.6829 | 8.116 |
| 0.9832 | −0.3607 | 8.116 | −0.6549 | 0.6892 | 8.116 |
| 0.9916 | −0.3565 | 8.116 | −0.6644 | 0.6936 | 8.116 |
| 0.9951 | −0.3526 | 8.116 | −0.6719 | 0.6963 | 8.116 |
| 0.9967 | −0.3496 | 8.116 | −0.6778 | 0.6975 | 8.116 |
| 0.9973 | −0.348 | 8.116 | −0.6828 | 0.6977 | 8.116 |
| 0.9975 | −0.3472 | 8.116 | −0.6866 | 0.6967 | 8.116 |

It will also be appreciated that the airfoil 200 disclosed in the above scalable Table 1 may be non-scaled, scaled up or scaled down geometrically for use in other similar turbine/compressor designs. Consequently, the coordinate values set forth in Table 1 may be non-scaled, scaled upwardly or scaled downwardly such that the general airfoil profile shape remains unchanged. A scaled version of the coordinates in Table 1 would be represented by X, Y and Z coordinate values of Table 1, with the X, Y and Z non-dimensional coordinate values converted to inches or mm (or any suitable dimensional system), multiplied or divided by a constant number. The constant number may be a fraction, decimal fraction, integer or mixed number.

The article of manufacture may also have a suction-side nominal airfoil profile substantially in accordance with suction-side Cartesian coordinate values of X, Y and Z set forth in a scalable table, the scalable table selected from the group of tables consisting of TABLE 1. The Cartesian coordinate values of X, Y and Z are non-dimensional values convertible to dimensional distances by multiplying the Cartesian coordinate values of X, Y and Z by a number. The X and Y coordinates, when connected by smooth continuing arcs, define airfoil profile sections at each Z height. The airfoil profile sections at each Z height are joined smoothly with one another to form a complete suction-side airfoil shape. The X, Y and Z coordinate values being scalable as a function of a number to provide a non-scaled, scaled-up or scaled-down airfoil profile.

The article of manufacture may also have a pressure-side nominal airfoil profile substantially in accordance with pressure-side Cartesian coordinate values of X, Y and Z set forth in a scalable table, the scalable table selected from the group of tables consisting of TABLE 1. The Cartesian coordinate values of X, Y and Z are non-dimensional values convertible to dimensional distances by multiplying the Cartesian coordinate values of X, Y and Z by a number. X and Y are coordinates which, when connected by smooth continuing arcs, define airfoil profile sections at each Z height. The airfoil profile sections at each Z height are joined smoothly with one another to form a complete pressure-side airfoil shape. The X, Y and Z values being scalable as a function of the number to provide one of a non-scaled, scaled-up and scaled-down airfoil.

The article of manufacture may be an airfoil or a stator vane configured for use with a compressor. The suction-side airfoil shape may lie in an envelope within +/−5% of a chord length in a direction normal to a suction-side airfoil surface location, or +/−0.25 inches in a direction normal to a suction-side airfoil surface location.

The number, used to convert the non-dimensional values to dimensional distances, may be a fraction, decimal fraction, integer or mixed number. The height of the article of manufacture may be about 1 inch to about 20 inches or more, or any suitable height as desired in the specific application.

A compressor 2, according to an aspect of the present invention, may include a plurality of stator vanes 23. Each of the stator vanes 23 include an airfoil 200 having a suction-side 310 airfoil shape, the airfoil 200 having a nominal profile substantially in accordance with suction-side 310 Cartesian coordinate values of X, Y and Z set forth in a scalable table, the scalable table selected from the group of tables consisting of TABLE 1. The Cartesian coordinate values of X, Y and Z are non-dimensional values convertible to dimensional distances by multiplying the Cartesian coordinate values of X, Y and Z by a number. The number, used to convert the non-dimensional values to dimensional distances, may be a fraction, decimal fraction, integer or mixed number. X and Y are coordinates which, when connected by smooth continuing arcs, define airfoil profile sections at each Z height. The airfoil profile sections at each Z height being joined smoothly with one another to form a complete suction-side 310 airfoil shape.

The compressor 2, according to an aspect of the present invention, may also have a plurality of stator vanes 23 having a pressure-side 320 nominal airfoil profile substantially in accordance with pressure-side Cartesian coordinate values of X, Y and Z set forth in scalable Table 1. The Cartesian coordinate values of X, Y and Z are non-dimensional values convertible to dimensional distances by multiplying the Cartesian coordinate values of X, Y and Z by a number. The number (which would be the same number used for the suction side) may be a fraction, decimal fraction, integer or mixed number. X and Y are coordinates which, when connected by smooth continuing arcs, define airfoil profile sections at each Z height, the airfoil profile sections at each Z height being joined smoothly with one another to form a complete pressure-side airfoil shape.

An important term in this disclosure is profile. The profile is the range of the variation between measured points on an airfoil surface and the ideal position listed in scalable Table 1. The actual profile on a manufactured blade may be different than those in scalable Table 1 and the design is robust to this variation meaning that mechanical and aerodynamic function are not impaired. As noted above, an approximately + or −5% chord and/or 0.25 inch profile tolerance is used herein. The X, Y and Z values are all non-dimensionalized.

The following are non-limiting examples of the airfoil profiles embodied by the present invention. On some compressors, each airfoil profile section (e.g., at each Z height) may be connected by substantially smooth continuing arcs. On other compressors, some of the airfoil profile sections may be connected by substantially smooth continuing arcs. Embodiments of the present invention may also be employed by a compressor having stage(s) with no airfoil profile sections connected by substantially smooth continuing arcs.

The disclosed airfoil shape increases reliability and is specific to the machine conditions and specifications. The airfoil shape provides a unique profile to achieve (1) interaction between other stages in the compressor; (2) aerodynamic efficiency; and (3) normalized aerodynamic and mechanical blade or vane loadings. The disclosed loci of points allow the gas turbine and compressor or any other suitable turbine/compressor to run in an efficient, safe and smooth manner. As also noted, any scale of the disclosed airfoil may be adopted as long as (1) interaction between other stages in the compressor; (2) aerodynamic efficiency; and (3) normalized aerodynamic and mechanical blade loadings are maintained in the scaled compressor.

The airfoil 200 described herein thus improves overall compressor 2 efficiency. Specifically, the airfoil 200 provides the desired turbine/compressor efficiency lapse rate (ISO, hot, cold, part load, etc.). The airfoil 200 also meets all aeromechanics, loading and stress requirements.

It should be understood that the finished article of manufacture, blade or vane does not necessarily include all the sections defined in the one or more tables listed above. The portion of the airfoil proximal to a platform (or dovetail) and/or tip may not be defined by an airfoil profile section. It should be considered that the airfoil proximal to the platform or tip may vary due to several imposed constraints. The airfoil contains a main profile section that is substantially defined between the inner and outer flowpath walls. The remaining sections of the airfoil may be partly, at least partly or completely located outside of the flowpath. At least some of these remaining sections may be employed to improve the curve fitting of the airfoil at its radially inner or outer portions. The skilled reader will appreciate that a suitable fillet radius may be applied between the platform and the airfoil portion of the article of manufacture, blade or vane.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An article of manufacture having a nominal airfoil profile substantially in accordance with Cartesian coordinate values of X, Y and Z set forth in a scalable table, the scalable table selected from the group of tables consisting of TABLE 1, wherein the Cartesian coordinate values of X, Y and Z are non-dimensional values convertible to dimensional distances by multiplying the Cartesian coordinate values of X, Y and Z by a number, and wherein X and Y are coordinates which, when connected by continuing arcs, define airfoil profile sections at each Z height, the airfoil profile sections at each Z height being joined with one another to form a complete airfoil shape.

2. The article of manufacture according to claim 1, wherein the article of manufacture comprises an airfoil configured for use with a compressor.

3. The article of manufacture according to claim 1, wherein the article of manufacture comprises a stator vane configured for use with a compressor.

4. The article of manufacture according to claim 1, wherein the airfoil shape lies in an envelope within one of:

+/−5% of a chord length in a direction normal to an airfoil surface location; and +/−0.25 inches in a direction normal to an airfoil surface location.

5. The article of manufacture according to claim 1, wherein the number, used to convert the non-dimensional values to dimensional distances, is one of a fraction, decimal fraction, integer and mixed number.

6. The article of manufacture according to claim 1, wherein a height of the article of manufacture is about 1 inch to about 20 inches.

7. An article of manufacture having a suction-side nominal airfoil profile substantially in accordance with suction-side Cartesian coordinate values of X, Y and Z set forth in a scalable table, the scalable table selected from the group of tables consisting of TABLE 1, wherein the Cartesian coordinate values of X, Y and Z are non-dimensional values convertible to dimensional distances by multiplying the Cartesian coordinate values of X, Y and Z by a number, and wherein X and Y are coordinates which, when connected by continuing arcs, define airfoil profile sections at each Z height, the airfoil profile sections at each Z height being joined with one another to form a complete suction-side airfoil shape, the X, Y and Z coordinate values being scalable as a function of the number to provide one of a non-scaled, scaled-up and scaled-down airfoil profile.

8. The article of manufacture according to claim 7, wherein the article of manufacture comprises an airfoil configured for use with a compressor.

9. The article of manufacture according to claim 7, wherein the article of manufacture comprises a stator vane configured for use with a compressor.

10. The article of manufacture according to claim 7, wherein the suction-side airfoil shape lies in an envelope within one of:

+/−5% of a chord length in a direction normal to a suction-side airfoil surface location; and +/−0.25 inches in a direction normal to a suction-side airfoil surface location.

11. The article of manufacture according to claim 7, wherein the number, used to convert the non-dimensional values to dimensional distances, is one of a fraction, decimal fraction, integer and mixed number.

12. The article of manufacture according to claim 7, wherein a height of the article of manufacture is about 1 inch to about 20 inches.

13. The article of manufacture according to claim 7, further comprising the article of manufacture having a pressure-side nominal airfoil profile substantially in accordance with pressure-side Cartesian coordinate values of X, Y and Z set forth in the scalable table, wherein the Cartesian coordinate values of X, Y and Z are non-dimensional values convertible to dimensional distances by multiplying the Cartesian coordinate values of X, Y and Z by the number, and wherein X and Y are coordinates which, when connected by continuing arcs, define airfoil profile sections at each Z height, the airfoil profile sections at each Z height being joined with one another to form a complete pressure-side airfoil shape, the X, Y and Z values being scalable as a function of the number to provide one of a non-scaled, scaled-up and scaled-down airfoil.

14. A compressor comprising a plurality of stator vanes, each of the stator vanes including an airfoil having a suction-side airfoil shape, the airfoil having a nominal profile substantially in accordance with suction-side Cartesian coordinate values of X, Y and Z set forth in a scalable table, the scalable table selected from the group of tables consisting of TABLE 1, wherein the Cartesian coordinate values of X, Y and Z are non-dimensional values convertible to dimensional distances by multiplying the Cartesian coordinate values of X, Y and Z by a number, and wherein X and Y are coordinates which, when connected by continuing arcs, define airfoil profile sections at each Z height, the airfoil profile sections at each Z height being joined with one another to form a complete suction-side airfoil shape.

15. The compressor according to claim 14, wherein the suction-side airfoil shape lies in an envelope within one of:

+/−5% of a chord length in a direction normal to a suction-side airfoil surface location; and +/−0.25 inches in a direction normal to a suction-side airfoil surface location.

16. The compressor according to claim 14, wherein the number, used to convert the non-dimensional values to dimensional distances, is one of a fraction, decimal fraction, integer and mixed number.

17. The compressor according to claim 14, wherein a height of each stator vane is about 1 inch to about 20 inches.

18. The compressor according to claim 14, further comprising each of the plurality of stator vanes having a pressure-side nominal airfoil profile substantially in accordance with pressure-side Cartesian coordinate values of X, Y and Z set forth in the scalable table, wherein the Cartesian coordinate values of X, Y and Z are non-dimensional values convertible to dimensional distances by multiplying the Cartesian coordinate values of X, Y and Z by the number, and wherein X and Y are coordinates which, when connected by continuing arcs, define airfoil profile sections at each Z height, the airfoil profile sections at each Z height being joined with one another to form a complete pressure-side airfoil shape.

19. The compressor according to claim 18, wherein the pressure-side airfoil shape lies in an envelope within one of:

+/−5% of a chord length in a direction normal to a pressure-side airfoil surface location; and +/−0.25 inches in a direction normal to a pressure-side airfoil surface location.

20. The compressor according to claim 18, wherein the number, used to convert the non-dimensional values to dimensional distances, is one of a fraction, decimal fraction, integer and mixed number.

* * * * *